(12) United States Patent
Daugherty et al.

(10) Patent No.: US 11,761,908 B2
(45) Date of Patent: Sep. 19, 2023

(54) IMAGING AND INSPECTION OF PLUGGED HONEYCOMB BODY

(71) Applicant: CORNING INCORPORATED, Corning, NY (US)

(72) Inventors: Julie Marie Daugherty, Horseheads, NY (US); Joshua Adam Jamison, Corning, NY (US); Russel Wayne Madara, Corning, NY (US); Duane Otis Sellers, Corning, NY (US); Eric Daniel Treacy, Beaver Dams, NY (US); Xiaotian Zou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/609,156

(22) PCT Filed: May 20, 2020

(86) PCT No.: PCT/US2020/033672
§ 371 (c)(1),
(2) Date: Nov. 5, 2021

(87) PCT Pub. No.: WO2020/242842
PCT Pub. Date: Dec. 3, 2020

(65) Prior Publication Data
US 2022/0214289 A1 Jul. 7, 2022

Related U.S. Application Data

(60) Provisional application No. 62/855,181, filed on May 31, 2019.

(51) Int. Cl.
*G01N 21/95* (2006.01)
*G01N 21/956* (2006.01)

(52) U.S. Cl.
CPC . *G01N 21/95692* (2013.01); *G01N 2201/021* (2013.01)

(58) Field of Classification Search
CPC ..... G01N 2035/00326; G01N 32/0092; G01N 35/1065; G01N 35/00; G01N 2035/00495;
(Continued)

(56) References Cited

U.S. PATENT DOCUMENTS

| | | | |
|---|---|---|---|
| 7,520,918 B2 | 4/2009 | Zoeller, III | |
| 8,049,878 B2 | 11/2011 | Zoeller, III | |
| 8,421,857 B2 | 4/2013 | Akao et al. | |
| 10,145,805 B2 | 12/2018 | Stanford et al. | |
| 2003/0174320 A1* | 9/2003 | Yokoyama | G01N 21/9515 356/237.6 |
| 2007/0132988 A1* | 6/2007 | Gargano | G01N 21/95692 356/237.6 |
| 2010/0238284 A1* | 9/2010 | Akao | G01N 21/95692 348/E7.091 |
| 2011/0128370 A1* | 6/2011 | Booth | G01N 21/952 348/125 |
| 2018/0238683 A1 | 8/2018 | Watanabe et al. | |

FOREIGN PATENT DOCUMENTS

| | | | | |
|---|---|---|---|---|
| JP | 2006-200957 A | 8/2006 | | |
| JP | 2013-140073 A | 7/2013 | | |
| JP | 2014025945 A | * 2/2014 | ............ | G01B 11/22 |
| WO | WO-2017073628 A1 | * 5/2017 | ........... | G01B 11/303 |
| WO | 2018/022445 A1 | 2/2018 | | |

OTHER PUBLICATIONS

International Search Report and Written Opinion of the International Searching Authority; PCT/US2020/033672; dated Aug. 18, 2020; 14 pages; European Patent Office.

* cited by examiner

*Primary Examiner* — Michael P Stafira
(74) *Attorney, Agent, or Firm* — Joseph M. Homa

(57) ABSTRACT

Inspection methods, apparatuses, and techniques are described herein for identifying defects in a plugged hon-
(Continued)

eycomb body (100). The inspection apparatuses and methods herein utilize reduced distortion imaging to identify the defects in the plugged honeycomb body. Backlit and/or directly illuminated images (by e.g. first light source 308) of the plugged honeycomb body (100) can be captured (by e.g. camera 302) and analyzed to align (by e.g. actuators 306) the plugged honeycomb body (100) in an imaging apparatus and to identify the defects.

25 Claims, 8 Drawing Sheets

(58) Field of Classification Search
CPC ....... G01N 2015/1006; G01N 21/8806; G01N 35/10; G01N 21/95692; G01N 35/026; G01N 35/00871; G01N 35/1072; G01N 15/1475; G01N 21/25; G01N 35/04; G01N 2015/1486; G01N 2035/0449; G01N 35/00069; G01N 2035/00306; G01N 21/27; G01N 33/5005; G01N 2035/00138; G01N 2035/00237; G01N 2035/00356; G01N 2035/00366; G01N 2035/00425; G01N 2035/0486; G01N 2035/0491; G01N 2201/024; G01N 2201/04; G01N 33/54366; G01N 35/00029; G01N 35/1009; G01N 35/1011; G01N 2015/0073; G01N 2015/008; G01N 2035/00148; G01N 2035/00435; G01N 2035/00633; G01N 2035/0474; G01N 2035/0493; G01N 2035/04994; G01N 2201/12; G01N 33/54306; G01N 33/54313; G01N 33/56972; G01N 33/56983; G01N 33/62; G01N 33/3827; G01N 33/80; G01N 33/92; G01N 35/00623; G01N 21/8851; G01N 2035/00881; G01N 21/95; G01N 21/952; G01N 35/0099; G01N 2015/0846; G01N 21/9515; G01N 2021/8825; G01N 2035/1076; G01N 21/01; G01N 21/65; G01N 33/48707; G01N 2035/00277; G01N 2035/1051; G01N 21/6428; G01N 21/76; G01N 21/78; G01N 2035/0094; G01N 2035/103; G01N 33/50; G01N 15/1434; G01N 2015/0065; G01N 21/55; G01N 21/6456; G01N 2021/0112; G01N 2021/4742; G01N 2021/479; G01N 2021/6441; G01N 2021/95638; G01N 21/07; G01N 21/474; G01N 21/4788; G01N 21/49; G01N 21/53; G01N 21/93; G01N 2201/0683; G01N 2201/08; G01N 2201/0826; G01N 27/622; G01N 35/02; G01N 1/40; G01N 1/4077; G01N 15/0227; G01N 15/0272; G01N 15/14; G01N 15/1425; G01N 15/1429; G01N 15/1436; G01N 15/1463; G01N 15/147; G01N 2001/4083; G01N 2015/0011; G01N 2015/003; G01N 2015/0053; G01N 2015/0294; G01N 2015/084; G01N 2015/1493; G01N 2015/1497; G01N 2021/3595; G01N 2021/558; G01N 2021/8841; G01N 2030/8827; G01N 2035/1048; G01N 21/21; G01N 21/59; G01N 21/645; G01N 21/6452; G01N 21/6458; G01N 21/88; G01N 21/954; G01N 21/95607; G01N 2201/062; G01N 30/88; G01N 2021/513; G01N 2021/6417; G01N 2021/6439; G01N 2021/6484; G01N 2021/8809; G01N 2021/8887; G01N 2035/1034; G01N 21/51; G01N 21/643; G01N 21/75; G01N 21/8422; G01N 21/9036; G01N 21/909; G01N 21/9501; G01N 21/9505; G01N 2201/021; G01N 2201/063; G01N 2201/0633; G01N 30/02; G01N 31/223; G01N 33/0062; G01N 33/0073; G01N 33/48; G01N 33/559; G01N 33/566; G01N 33/86; G01N 1/2252; G01N 1/30; G01N 15/08; G01N 15/0806; G01N 15/1468; G01N 19/02; G01N 2001/264; G01N 2015/0038; G01N 2021/825; G01N 2035/00811; G01N 21/35; G01N 21/41; G01N 21/4133; G01N 21/552; G01N 21/6486; G01N 33/02; G01N 33/5302; G01N 33/6803; G01N 35/00584; G01N 35/00732; G01N 35/0098; G01N 1/22; G01N 1/2273; G01N 1/26; G01N 15/00; G01N 15/06; G01N 15/082; G01N 15/088; G01N 15/1459; G01N 2001/021; G01N 2015/0693; G01N 2021/6463; G01N 2021/7786; G01N 2021/95676; G01N 2035/00158; G01N 2035/00465; G01N 2035/00683; G01N 2035/00772; G01N 2035/0403; G01N 2035/0477; G01N 21/00; G01N 21/13; G01N 21/251; G01N 21/31; G01N 21/3504; G01N 21/3554; G01N 21/648; G01N 21/763; G01N 21/7703; G01N 21/84; G01N 21/8914; G01N 21/956; G01N 2201/0221; G01N 27/30; G01N 27/416; G01N 30/72; G01N 30/7206; G01N 33/0036; G01N 33/0057; G01N 33/0075; G01N 33/483; G01N 33/4833; G01N 33/487; G01N 33/49; G01N 33/491; G01N 33/4915; G01N 33/493; G01N 33/497; G01N 1/38; G01N 17/00; G01N 2021/7759; G01N 2021/8829; G01N 2021/8877; G01N 21/66; G01N 2223/419; G01N 23/046; G01N 2333/521; G01N 2333/755; G01N 2333/96494; G01N 25/42; G01N 2800/12; G01N 2800/52; G01N 31/227; G01N 33/6893; G01N 35/1095; G01N 29/265; G01N 2291/2694; G01N 2291/0231; G01N 29/043; G01N 2291/106; G01N 29/225; G01N 29/28; G01N 2291/044; G01N 25/72; G01N 29/11; G01N 2291/102; G01N 2291/048; G01N 29/223; G01N 29/226; G01N 2291/0422; G01N 29/04; G01N 2291/0289; G01N 29/348; G01N 2201/06113; G01N 29/041; G01N 2291/2638; G01N 29/30; G01N 2223/646; G01N 2291/02854; G01N 29/0645; G01N 29/2412; G01N 21/94; G01N 22/04; G01N 29/12; G01N 19/04; G01N 29/343; G01N 2291/023; G01N 29/07; G01N 29/2418; G01N 29/2481; G01N 3/10; G01N 33/388; G01N 2021/8472; G01N 2291/0427; G01N 29/045; G01N 21/47; G01N 23/04; G01N 29/221; G01N 29/262; G01N 29/46; G01N 21/8803; G01N 2201/103; G01N 2291/0421; G01N 2291/2634; G01N 29/0672; G01N 29/24; G01N 3/12; G01N 2021/1787; G01N 2203/0274; G01N 2203/0647; G01N 2291/0258; G01N 2291/0423; G01N 29/048; G01N 29/0654; G01N 29/14; G01N 29/22; G01N 29/32; G01N 3/32; G01N 21/9508; G01N 2203/0208; G01N 2291/0234; G01N 27/902; G01N 29/069; G01N 29/44; G01N 29/4427; G01N 1/28; G01N 15/0826; G01N 2021/845; G01N 2203/0007; G01N 2203/0067; G01N 2203/0266; G01N 2203/0417; G01N 2291/0232; G01N 27/90; G01N 29/075; G01N 29/4436; G01N 29/4463; G01N 3/068; G01N 3/24; G01N 3/60; G01N 19/08; G01N 2021/1768; G01N 2203/0017; G01N 23/00; G01N 33/383; G01N 2203/0039; G01N 29/0609; G01N 29/2468; G01N 29/2475; G01N 29/4454; G01N 3/30; G01N 22/02; G01N 2203/0062; G01N 2203/0212; G01N 2203/0248; G01N 2291/015; G01N 2291/056; G01N 2291/105; G01N 29/2487; G01N 29/4472; G01N 15/02; G01N 21/57; G01N 23/044; G01N 29/42; G01N 21/4738; G01N 2203/0064; G01N 2291/0428; G01N 2291/2632; G01N 23/043; G01N 23/083; G01N 29/27; G01N 29/38; G01N 3/303; G01N 15/0205; G01N 21/455; G01N 21/91; G01N 2201/0696; G01N 2203/0069; G01N 2203/0076; G01N 2291/2693; G01N 27/4035; G01N 3/20; G01N 21/1702; G01N 21/3563; G01N 21/9045; G01N 21/95623; G01N 2203/0019; G01N 2203/0256; G01N 23/10; G01N 23/18; G01N 23/203; G01N 24/084; G01N 25/16; G01N 29/09; G01N 29/26; G01N 29/275; G01N 3/08; G01N 9/24; G01N 1/286; G01N 1/32; G01N 15/0625; G01N 15/0893; G01N 2011/0053; G01N 2021/8427; G01N 2021/8861; G01N 2021/888; G01N 2035/00752; G01N 220/00; G01N 2291/014; G01N 2291/0235; G01N 2291/0238; G01N 2291/263; G01N 23/02; G01N 23/22; G01N 23/2202; G01N 23/2206; G01N 23/223; G01N 23/225; G01N 25/20; G01N 27/84; G01N 27/9006; G01N 27/9026; G01N 29/2406; G01N 29/245; G01N 29/2493; G01N 29/4418; G01N 29/4445; G01N 3/34; G01N 33/14; G01N 33/222; G01N 5/04; G01N 17/006; G01N 2021/635; G01N 2021/8905; G01N 21/3581; G01N 21/359; G01N 21/85; G01N 21/8901; G01N 21/894; G01N 21/90; G01N 2203/0284; G01N 2203/0286; G01N 2203/0658; G01N 2291/02827; G01N 2291/0425; G01N 29/06; G01N 29/36; G01N 30/06; G01N 1/2853; G01N 1/36; G01N 2021/0346; G01N 2021/1714; G01N 2021/556; G01N 2021/8578; G01N 2021/8835; G01N 2021/8848; G01N 2021/9513; G01N 2021/9518; G01N 2021/9546; G01N 2030/884; G01N 2033/008; G01N 21/05; G01N 21/71; G01N 21/892; G01N 21/9054; G01N 21/951; G01N 2201/06126; G01N 2201/06146; G01N 2201/0631; G01N 2201/0635; G01N 2201/0642; G01N 2201/0813; G01N 2203/0023; G01N 2203/0025; G01N 2203/0046; G01N 2203/0091; G01N 2203/0226; G01N 2203/0228; G01N 2203/0282; G01N 2203/0452; G01N 2203/0688; G01N 2223/408; G01N 2223/615; G01N 2223/631; G01N 2291/0217; G01N 2291/02491; G01N 2291/02836; G01N 2291/02863; G01N 2291/02872; G01N 2291/101; G01N 2291/104; G01N 2291/267; G01N 2291/2698; G01N 23/05; G01N 23/16; G01N 23/2251; G01N 24/081; G01N 25/56; G01N 27/226; G01N 27/72; G01N 27/9046; G01N 27/906; G01N 29/00; G01N 29/0618; G01N 29/228; G01N 29/2437; G01N 29/346; G01N 3/40; G01N 30/20; G01N 31/00; G01N 31/10; G01N 33/00; G01N 33/442; G01N 33/6896; G01N 35/028; G01N 1/00; G01N 1/2247; G01N 1/34; G01N 17/02; G01N 2001/2285; G01N 2015/0866; G01N 2021/178; G01N 2021/1785; G01N 2021/213; G01N 2021/3196; G01N 2021/4764; G01N 2021/6432; G01N 2021/6482; G01N 2021/8416; G01N 2021/8592; G01N 2021/8854; G01N 2021/8858; G01N 2021/8864; G01N 2021/887; G01N 2021/8874; G01N 2021/8909; G01N 2033/0081; G01N 2035/1037; G01N 21/211; G01N 21/272; G01N 21/29; G01N 21/45; G01N 21/8483; G01N 21/89; G01N 21/9018; G01N 21/9072; G01N 2201/10; G01N 2203/0042; G01N 2203/0246; G01N 2203/0298; G01N 2203/0641; G01N 2203/0664; G01N 2203/0682; G01N 2223/01; G01N 2223/03; G01N 2223/053; G01N 2223/07; G01N 2223/0745; G01N 223/076; G01N 2223/081; G01N 2223/0813; G01N 2223/1016; G01N 2223/202; G01N 2223/204; G01N 2223/319; G01N 2223/33; G01N 2223/3302; G01N 2223/40; G01N 2223/401; G01N 2223/404; G01N 2223/411; G01N 2223/415; G01N 2223/6116; G01N 2223/6265; G01N 2223/629; G01N 2223/6462; G01N 2291/0237; G01N 2291/02475; G01N 2291/028; G01N 2291/26; G01N 23/041; G01N 23/087; G01N 23/20066; G01N 25/00; G01N 25/18; G01N 25/488; G01N 29/2431; G01N 29/34; G01N 29/345; G01N 29/40; G01N 29/50; G01N 3/00; G01N 3/307; G01N 3/317; G01N 31/22; G01N 33/0001; G01N 33/0004; G01N 33/0014;
G01N 33/0032; G01N 33/085; G01N
33/207; G01N 33/44; G01N 33/48721;
G01N 33/5011; G01N 33/5064;
G01N33/525; G01N 35/00613; G01N
35/00663; G01N 35/1002; G01N
35/1074; G01N 5/025; G01N 7/10

See application file for complete search history.

IMAGING AND INSPECTION OF PLUGGED HONEYCOMB BODY

This is a national stage application under 35 U.S.C. § 371 of International Application No. PCT/US2020/033672, filed on May 20, 2020, which claims the benefit of priority under 35 U.S.C. § 119 of U.S. Provisional Application Ser. No. 62/855,181 filed on May 31, 2019, the content of which is incorporated herein by reference in its entirety.

BACKGROUND

Honeycomb bodies are used in particulate filters (plugged) and catalytic converters (unplugged) for treating or removing pollutants from a gas flow such as engine combustion exhaust.

SUMMARY

Various approaches are described herein for, among other things, providing improved imaging and inspection of a plugged honeycomb body. Currently disclosed embodiments include an apparatus for imaging a plugged honeycomb body that has means for providing low distortion images of the plugged honeycomb body. In one aspect, the imaging apparatus can be configured to provide backlit images of the honeycomb body. In another aspect, the imaging apparatus can be configured to provide directly illuminated images of the plugged honeycomb body.

In one aspect, an apparatus for imaging a plugged honeycomb body is provided. The apparatus comprises a first camera and a first lens optically coupled to a first camera, the first lens having a field of view; and a first light source disposed opposite the first lens; wherein the plugged honeycomb body can be positioned between the first lens and the first light source such that the field of view encompasses a profile of a first side of the plugged honeycomb body; wherein the first light source is configured to emit light toward a second side of the plugged honeycomb body opposite to the first side with a light emitting area larger than the profile of the first side of the plugged honeycomb body; wherein a part of the emitted light is obstructed from the first lens by the plugged honeycomb body, and another part of the emitted light is received by the first lens unobstructed by the plugged honeycomb body.

In another aspect, an apparatus for imaging a plugged honeycomb body is provided. The apparatus comprises a first imaging station, comprising: a first camera disposed on a first side of the plugged honeycomb body adjacent a first end surface of the plugged honeycomb body when the plugged honeycomb body is disposed in a first location; a first lens optically coupled to the first camera, the first lens having parallax distortion less than 0.3% in at least a portion of a field of view of the first lens that encompasses a profile of the plugged honeycomb body when a longitudinal axis of the plugged honeycomb body is aligned relative to an optical axis of the first lens by an angle of less than or equal to 20°; a first actuator configured to move at least one of the first camera or the first lens; a first light source disposed on a second side of the plugged honeycomb body opposite the first side and adjacent a second end surface of the plugged honeycomb body, the first light source configured to project light at the plugged honeycomb body so that the plugged honeycomb body obstructs a portion of the projected light to project the profile of the honeycomb body on the first lens, the first light source defining an illumination area larger than the profile corresponding to the plugged honeycomb body, and the first light source configured to illuminate a portion of the first lens outward of the profile corresponding to the plugged honeycomb body; and a second light source disposed on the first side of the plugged honeycomb body; a material handler configured to move the plugged honeycomb body from the first location in the first imaging station to a second location in a second imaging station; and the second imaging station, comprising: a second camera disposed on the second side of the plugged honeycomb body adjacent the second end surface of the plugged honeycomb body when the plugged honeycomb body is disposed in the second location; a second lens optically coupled to the second camera, the second lens having parallax distortion less than 0.3% in at least a portion of a field of view of the second lens; a second actuator configured to move at least one of the second camera or the second lens; a third light source disposed on the first side of the plugged honeycomb body adjacent the first end surface of the plugged honeycomb body; and a fourth light source disposed on the second side of the plugged honeycomb body adjacent the second end surface of the plugged honeycomb body.

In another aspect, a method of inspecting a plugged honeycomb body is provided. The method comprises illuminating the plugged honeycomb body with light from a first light source to project a profile of the plugged honeycomb body onto the first lens by obstructing a portion of the light with the plugged honeycomb body; capturing a first image of the profile corresponding to the plugged honeycomb body with the first camera; analyzing the profile in the first image to determine alignment of a longitudinal axis of the plugged honeycomb body relative to an optical axis of the first lens; moving the actuator to change the alignment of the longitudinal axis of the plugged honeycomb body relative to the optical axis of the first lens by aligning the optical axis of the first lens and the longitudinal axis of the plugged honeycomb body; capturing a second image of the plugged honeycomb body with the first camera; illuminating the plugged honeycomb body with the second light source; and capturing a third image of the plugged honeycomb body with the first camera.

It is noted that the claims are not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
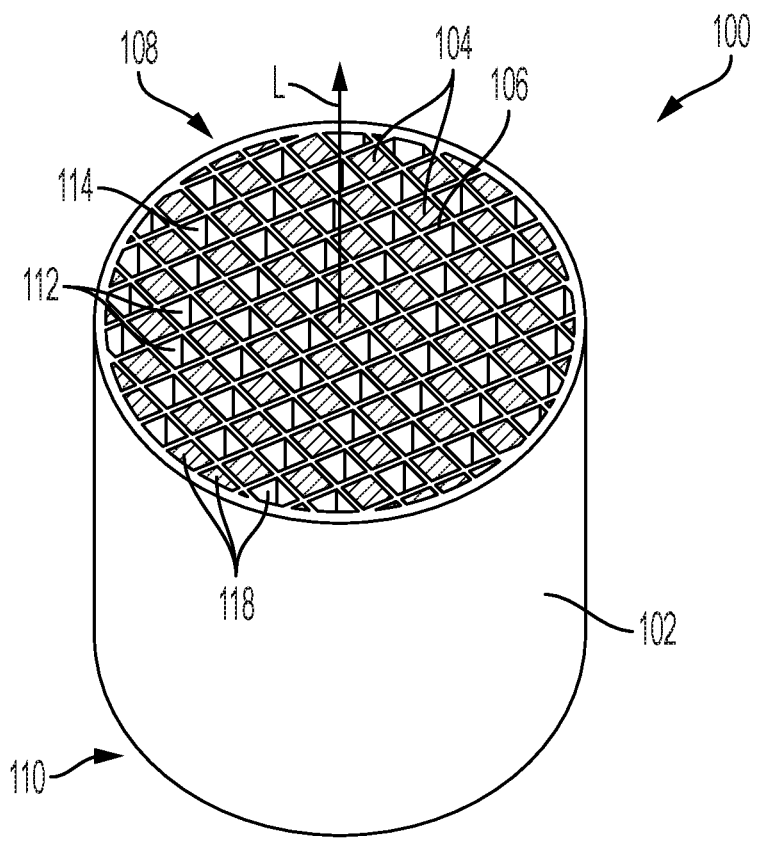
FIG. 1 is a perspective view of an exemplary plugged honeycomb body.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described includes a particular feature, structure, or characteristic, but it is not necessary for all other disclosed embodiments to include that particular feature, structure, or characteristic. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein provide improvements over known inspection systems utilized for inspecting plugged honeycomb bodies. The example embodiments comprise imaging apparatuses that are capable of providing low distortion imaging that allows improved alignment and defect detection of a plugged honeycomb body without requiring type-tooling (i.e., different tooling for each different size, shape, or other type of honeycomb body). The example embodiments can be capable of providing backlit images of the plugged honeycomb body and can be capable of providing directly illuminated images of an end face of the plugged honeycomb body while the plugged honeycomb body remains in a single orientation and location. For instance, example embodiments are capable of providing backlit and directly illuminated images of both end faces of the plugged honeycomb body while the plugged honeycomb body remains in a single orientation and location. Example embodiments are capable of providing backlit and directly illuminated images of the plugged honeycomb body simultaneously.

The example embodiments described herein include a production line that comprises an imaging apparatus that provides one or more of the aforementioned features and benefits. In some example embodiments, the production line is capable of performing inspection of both end faces of a plugged honeycomb body by capturing and using backlit and directly illuminated images. In some example embodiments, the production line performs analysis of plugging defects to determine whether the plugging defects meet one or more pass/fail thresholds. In some example embodiments, the production line sorts plugged honeycomb bodies according to pass/fail determinations.

Example methods are described that provide improvements over known inspection methods. The example methods generally comprise aligning a plugged honeycomb body with a lens and capturing images of the plugged honeycomb body. In some example embodiments, the method comprises illuminating the plugged honeycomb body with a first light source on an opposite side of the plugged honeycomb body and capturing a backlit image of the plugged honeycomb body. In some example embodiments, the method comprises illuminating the plugged honeycomb body with a second light source on the same side as the lens and capturing a directly illuminated image of the plugged honeycomb body.

The example embodiments described herein eliminate a need for type-tooling that is specific to the design of the honeycomb body, e.g., to provide a sealed environment to prevent leakage of back lighting around the honeycomb body, as in some inspection systems. An advantage of eliminating the need for type-tooling is that it allows the projected shape or profile of the plugged honeycomb body to be used for improved alignment of the plugged honeycomb body. In this way, the example embodiments are less sensitive to environmental light, as compared to conventional inspection techniques. The example embodiments are capable of reducing an amount of time that is consumed to inspect a plugged honeycomb body quickly, e.g., in less than 20 seconds per honeycomb body, by reducing the amount of material handling that is performed during inspection. Example embodiments provide both backlit and directly illuminated imaging so that different types of defects can be simultaneously monitored, e.g., defects caused by an absence of plug material and defects caused by extra plug material. Still further, the example embodiments enable defects to be analyzed more precisely. For instance, the example embodiments enable relatively small defects, such as those sized on the order of 250 µm, to be identified and measured. The example embodiments enable images taken from both ends of a honeycomb body that are backlit and directly illuminated to be used to further analyze and measure defects.

Figure 2:
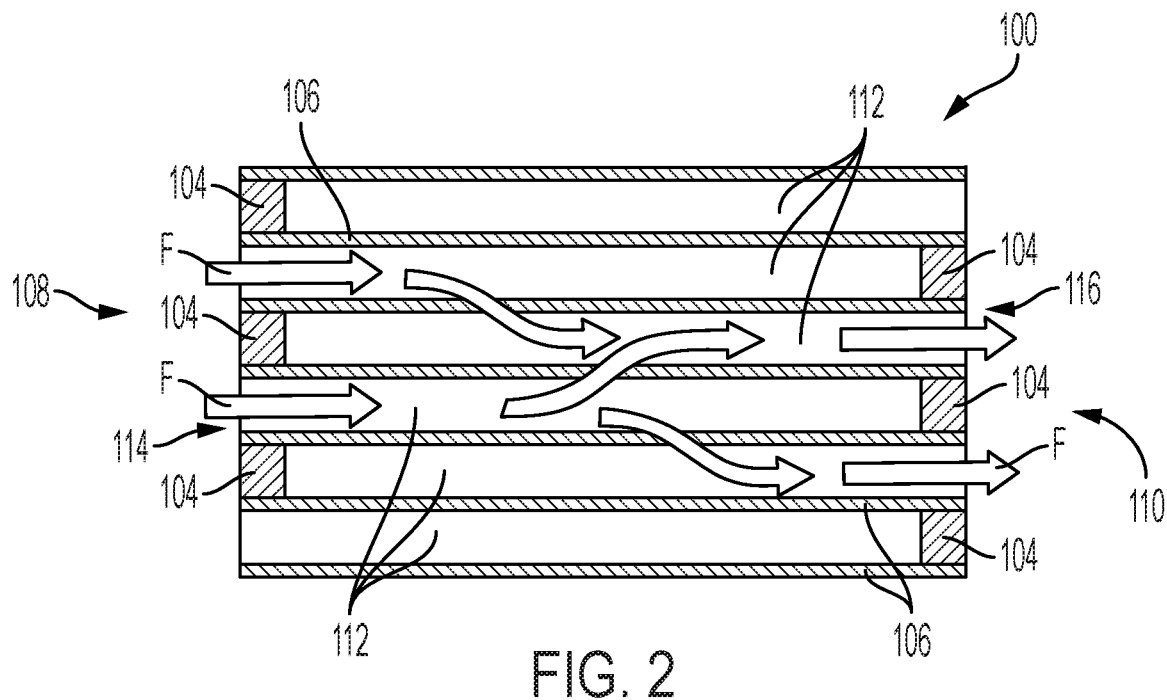
FIG. 2 is a side cross-sectional view of a portion of the plugged honeycomb body of FIG. 1.

FIGS. 1 and 2 illustrate an exemplary plugged honeycomb body 100. The plugged honeycomb body 100 is generally constructed from a porous honeycomb structure 102, e.g., formed from an extruded ceramic material. The porous honeycomb structure 102 comprises inner walls 106 spaced from each other and extending longitudinally from a first end 108 to a second end 110. The inner walls 106 combine to define a plurality of channels, or cells 112, that form passages extending through the honeycomb structure 102 from the first end 108 to the second end 110 and form the cellular construction of the porous honeycomb structure 102. Some of the channels 112, e.g., alternating ones of the channels 112, comprise plugs 104 therein.

The porous honeycomb structure 102 can be constructed from one or more porous materials having a predetermined pore size selected to block particulates carried in a gas of a working fluid (e.g., vehicle engine exhaust or other fluid flow) that is forced to flow through the pores. The porous honeycomb structure 102 is generally formed from an extruded ceramic material that is subsequently fired to form open pores.

The plurality of plugs 104 are positioned throughout the porous honeycomb structure 102 to form a labyrinth that defines a desired flow path F of the working fluid, shown in FIG. 2. The flow path F is configured to direct the working fluid flow through at least portions of the cells 112 and at least portions of the inner walls 106. In this way, the plugged honeycomb body 100 may be referred to as a wall-flow filter. The plugs 104 are installed in select cells 112 adjacent the first end 108, and in select cells 112 adjacent the second end 110 of the porous honeycomb structure 102 to form the plugged honeycomb body 100. In the illustrated example, the plugs 104 are located so that they generally form a checkerboard pattern in the first end 108 so that alternating cells are plugged. The porous honeycomb body 100 also comprises peripheral cells 118 that are generally partial cells that intersect an outer skin 120 of the plugged honeycomb body 100, and those peripheral cells 118 can be each plugged, or plugged in accordance with the alternating pattern of the other cells. The plugs 104 are configured so that working fluid is inhibited (e.g., impeded, hindered, blocked, or prevented) from flowing past the plug 104.

As illustrated, the plugged honeycomb body 100 comprises cells having a square cross-sectional shape, but the cells can have other cross-sectional shapes, such as triangular, hexagonal, polygonal, etc. Additionally, other patterns for the plugs 104 can be incorporated in the plugged honeycomb body 100, and the pattern need not be limited to a checkerboard pattern. As another example, the cells 112 that are plugged and unplugged at each end of the honeycomb body 100 can have different shapes and/or sizes. For example, cells 112 that are open at an inlet end of the honeycomb body 100 (and plugged at the outlet end) can have a larger size (hydraulic diameter) than cells 112 that are open at the outlet end (and plugged at the inlet end). The plugged honeycomb body 100 defines a longitudinal axis L that extends from the first end 108 to the second end 110 and that is substantially parallel to a longitudinal axis of the cells 112.

The plugs 104 are generally located so that each cell 112 that is plugged at the first end 108 is not plugged at the second end 110, and each cell 112 that is not plugged at the first end 108 is plugged at the second end 110. In that configuration, the working fluid can enter the plugged honeycomb body 100 via a first cell 114 and exit the plugged honeycomb body 100 via a second cell 116 after passing through pores in the inner wall 106 interposed between the first cell 114 and the second cell 116, with particulate matter (e.g., soot) becoming trapped in or captured by the first cell 114. That configuration is one example of the first cell 114 being fluidly coupled to the second cell 116 via pores in the inner wall 106. As a result, the working fluid is able to flow from the first cell 114 to the second cell 116, while filtering out particulate matter in the working fluid. Rach of the cells 112 can be fluidly coupled to a plurality of adjacent cells 112.

Figure 3:
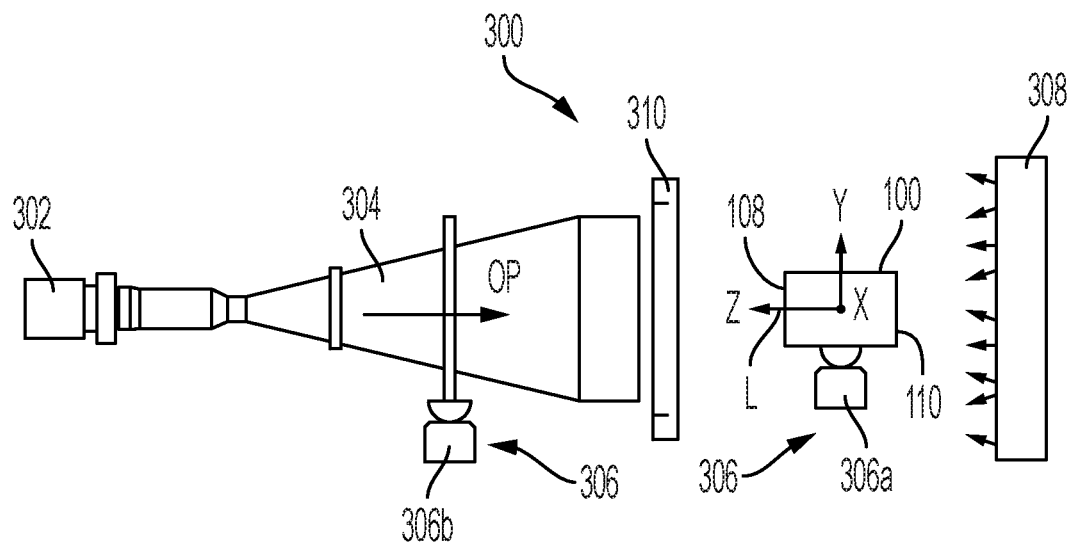
FIG. 3 is a side view of an example apparatus for imaging a plugged honeycomb body in accordance with an embodiment disclosed herein.

FIG. 3 illustrates an embodiment of an example apparatus 300 for imaging a plugged honeycomb body 100, that is capable of providing inspection of a plugged honeycomb body 100. The imaging apparatus 300 comprises a camera 302, a lens 304, an actuator 306, a first light source 308, and a second light source 310. In accordance with the embodiments disclosed herein, the imaging apparatus 300 allows for both directly illuminated and backlit images to be captured from a first side of the plugged honeycomb body 100, e.g., without requiring any fixturing customized to seal around the perimeter of the plugged honeycomb body 100 and while the plugged honeycomb body 100 remains in a single orientation and location.

The camera 302 is disposed on a first side of the plugged honeycomb body 100 and is configured to capture images of the plugged honeycomb body 100. The camera 302 can be a digital camera that is configured to record digital image data corresponding to the plugged honeycomb body 100. The digital image data is based at least in part on an image of the plugged honeycomb body 100 that passes through the lens 304 and is projected onto a digital image sensor in the camera 302. Camera 302 can be configured to collect monochromatic or multi-color image data. Exemplary digital cameras that can be employed are the Dalsa Falcon 4, 86 MP digital camera; and the Prosilica GT 6600 28.8 MP digital camera. In an example embodiment, the camera 302 has a resolution relating to a physical dimension of the plugged honeycomb body 100 that corresponds to approximately 20-50 µm per pixel, in another embodiment 30-40 µm per pixel, and in another embodiment about 35-36 µm per pixel. As an example, at 40 µm per pixel, a cylindrical plugged honeycomb body having a 6.5" diameter can be imaged with a 17 MP digital camera.

The lens 304 is also disposed on the first side of the plugged honeycomb body 100 and defines an optical axis OP. The lens 304 is optically coupled to the camera 302, by which it is meant that the lens 304 is arranged with respect to the camera 302 so that an image of the plugged honeycomb body 100 is passed through the lens 304 and directed to the camera 302, e.g., where the image is received by the digital image sensor of the camera 302. The lens 304 can be integrated as part of the camera 302, be part of an optical stack or assembly, be configured to be detachably coupled to the camera 302 (which can include one or more additional lenses), or otherwise positioned or arranged to direct images within the field of view of the lens 304 to the camera 302. In the illustrated embodiment, the lens 304 is interposed between the camera 302 and the plugged honeycomb body 100, and is sized to receive light corresponding to an image of the entire plugged honeycomb body 100 (e.g., no portion of the plugged honeycomb body 100 is cropped or missing from the image captured by the camera 302).

The lens 304 can also be sized and positioned to receive an image of a profile 405 (described in greater detail below) of the plugged honeycomb body 100 projected onto the lens 304 by backlighting. In some example embodiments, the field of view of the lens 304 is sized to capture the entirety of the profile 405 of the plugged honeycomb body 100 when the longitudinal axis L of the plugged honeycomb body 100 is angled relative to the optical axis OP of the lens 304. In other words, even if the honeycomb body 100 is misaligned relative to the lens 304, i.e., the longitudinal axis L is out of alignment with respect to the optical axis OP, the profile 405 of the plugged honeycomb body 100 will still fit within the field of view of the lens 304. In some embodiments, the lens 304 is configured with a field of view that encompasses the profile of the honeycomb body 100 (i.e., the entire profile of the honeycomb body 100 fits within the field of view of the lens 304) even when the longitudinal axis L of the plugged honeycomb body is aligned at an angle of at least 10° relative to the optical axis OP of the lens 304. In other embodiments, the angle is at least 20° or even 25° or 30°. The lens 304 is configured to have low distortion so that images captured by the first camera 302 can be used to align the lens 304 and the plugged honeycomb body 100, and so that physical measurements of the plugged honeycomb body 100 and/or defects in the plugged honeycomb body 100 can be collected as discussed herein.

Lenses may have angular fields of view which result in the magnification of an image changing as the distance between the lens and an object being imaged changes. That angular field of view may result in parallax, which causes variability in measurements of an object taken from an image that passes through the lens based on the object's physical relationship to the lens. In order to promote accurate measurements taken from images of objects that are not precisely in the same location each time, the lens 304 in some embodiments comprises a parallax distortion of less than 0.3% in at least a portion of the field of view of the lens 304. In some example embodiments, the lens 304 is configured to have parallax distortion less than 0.1% in at least a portion of the field of view of the lens 304. An example of a lens having parallax distortion of less than 0.3% over a portion of the field of view of the lens that can be used in the embodiments described herein is a telecentric lens.

In an example embodiment, the lens 304 is sized to provide a field of view that is greater than a diameter of an end face of the plugged honeycomb body 100. In an example, a lens 304 having a field of view of about 10.5" can be used to image a plugged honeycomb body 100 having an end face with up to a 10" diameter. In one embodiment, the lens 304 is a Moritex MTL-26543M58-016 bi-telecentric lens.

The actuator 306 is configured to move the plugged honeycomb body 100, the camera 302, and/or the lens 304 relative to each other in order to acquire a desired alignment between the components for more accurate imaging. For example, such as by aligning the longitudinal axis L of the plugged honeycomb body 100 with the optical axis OP of the lens 304 so that the longitudinal axis L and the optical axis OP are substantially parallel. The actuator 306 can also allow images of the plugged honeycomb body 100 to be captured at predefined inspection angles. In an example embodiment, the actuator 306 comprises a plurality of sub-actuators 306a, 306b that are configured to move components of the system and the plugged honeycomb body 100. As an example, sub-actuator 306a can be a multi-axis stage configured to translate the plugged honeycomb body 100 along multiple axes. Sub-actuator 306a can be configured to translate the plugged honeycomb body 100 on at least two axes that are generally perpendicular to the optical axis OP defined by lens 304 (i.e., parallel to the X-axis and Y-axis shown in FIG. 3).

The camera 302 can be fixed to the lens 304 and the combined camera 302 and lens 304 can be movable by sub-actuator 306b. Sub-actuator 306b can be a gimbal that is configured to translate and rotate the combined camera 302 and lens 304. Sub-actuator 306b can be configured to translate the combined camera 302 and lens 304 along an axis that is generally parallel to the optical axis OP of lens 304 so that the combined camera 302 and lens 304 can be translated toward or away from the plugged honeycomb body 100. Sub-actuator 306b can also be configured to tilt the combined camera 302 and lens 304. For example, the combined camera 302 and lens 304 can be gimbaled to rotate about an axis parallel to the X-axis to define a pitch angle, and to rotate about an axis parallel to the Y-axis to define yaw angle.

The first light source 308 is disposed on a second side of the plugged honeycomb body 100 opposite the first side. The first light source 308 can be configured to produce diffuse light and to emit the diffuse light generally toward the plugged honeycomb body 100, which obstructs a portion of the emitted light. The first light source 308 can be used to backlight the honeycomb body 100, i.e., so that the camera 302 captures one or more backlit images of the plugged honeycomb body, such as the backlit image shown in FIG. 4.

A backlit image can be used during alignment of the plugged honeycomb body 100 relative to the lens 304. When the plugged honeycomb body 100 is illuminated by the first light source 308, the plugged honeycomb body 100 obstructs, or blocks, a portion of the light and projects the profile 405 of the plugged honeycomb body 100 on the lens 304. As discussed in more detail below, the shape and size of the profile 405 changes with the orientation of the plugged honeycomb body 100 relative to the lens 304.

According to embodiments disclosed herein, the size and shape of that profile 405 is analyzed to determine the alignment between the plugged honeycomb body 100 and the lens 304. For example, as shown in FIG. 4, the profile 405 of the plugged honeycomb body 100 comprises a skin portion 402 and an end face portion 404, with the overall size and shape of the profile 405 formed as a combination of the two.

Figure 4:
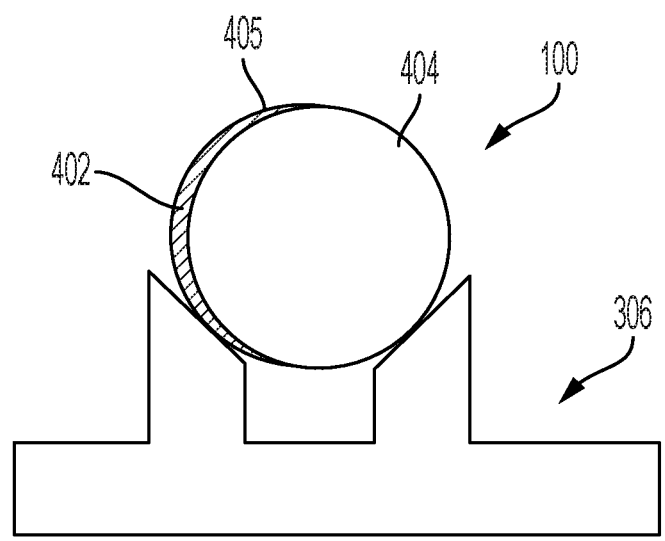
FIG. 4 is an example of a backlit image of a plugged honeycomb body taken by an imaging apparatus in accordance with an embodiment.

Due to the orientation of the honeycomb body 100 with respect to the light emitted by the first light source 308, which can be appreciated in view of FIGS. 3-4, the end portion 402 (corresponding to the end face 108) will receive essentially no light from the light source 308, as it is arranged as substantially facing away from the light source 308. In this way, the end portion 402 will be perceived by the lens 304 and camera 302 as relatively dark or in shadow. In comparison, the skin portion 402 is arranged to receive some of the light emitted by the light source 308. In this way, the light reflected off the skin portion 402 will enable the lens 304 and camera 302 to perceive the skin portion 404 as being relatively lighter or more illuminated than the end portion 402. This difference in illumination between the skin portion 402 and the end portion 402 of the profile 405 can be used to enable a controller (e.g., in or connected to the camera 302) to differentiate the end portion 402 from the skin portion 402 in images of the honeycomb body 100 captured by camera 302 using the lens 304. The amount of light reflected off the skin of the honeycomb body 100 can be increased by configuring the light source 308 to emit diffuse light, by configuring the light source 308 with a light emitting surface that is larger than the profile 405 of the honeycomb body, and/or arranging the light source 308 with a light source and/or light emitting surface that is aimed toward the skin of the honeycomb body 100.

In parallel alignment between the longitudinal axis L of the plugged honeycomb body 100 and the optical axis OP of the lens 304, the lens 304 would not "see" any skin portion 402 (e.g., the skin portion 402 being aligned entirely parallel to the optical axis OP) and the overall profile 405 would be the same as the face portion 404. As the misalignment between the longitudinal axis L of the plugged honeycomb body 100 and the optical axis OP increases, the skin portion 402 gets larger and the overall size and shape of the profile 405 changes. In this way, the shape and size of the skin portion 402, the face portion 404, and/or the profile 405 can be analyzed, e.g., using a controller such as a processor. Per the above, alignment of the longitudinal axis L with the optical axis OP can be determined when the size of the profile 405, the size of the skin portion 402 is minimized, and/or the shape and size of the face portion 404 corresponds to the intended cross-sectional shape of the honeycomb body 100 (e.g., circular in the illustrated embodiments).

Backlit images can also be used to identify other defects, such as leaks and the presence of excess material on the skin of the honeycomb body (e.g., "goobers"). For example, a backlit image permits the integrity of the plugs 104 to be determined, i.e., whether a leak is present, by locating portions of the plugged honeycomb body 100 that allow light to pass through or around the plugs 104. For example, a fully plugged honeycomb body (i.e., having every channel plugged at at least one end face) should block all light from passing to the lens 304 from the channels 112. When light is able to pass through or around a plug 104, brighter regions are present in the backlit image. Additionally, goobers generally present themselves as deviations (e.g., bumps, lumps, projections, and/or protrusions) on the outer edge of the profile 405 captured in the backlit image.

The first light source 308 can be a diffuse light panel directed at the plugged honeycomb body 100 that defines an illumination area. The illumination area can generally correspond to the surface area of the portion of the first light source 308 that emits light. For example, in some embodiments the first light source 308 is a diffuse light panel providing up to 60,000 Lux adjustable intensity that emits uniform monochromatic red light over a 15"×15" illumination area. In an example embodiment, the first light source 308 is sized to define an illumination area that is larger than the profile 405. The first light source 308 can also be sized to illuminate a portion of the lens 304 outward of the profile 405 for predefined orientations of the plugged honeycomb body 100 so that the entire perimeter of the profile 405 can be captured in a backlit image for those orientations (i.e., the field of view of the lens 304 encompasses the entirety of the profile 405). For example, the predefined orientations can be those where misalignment between the longitudinal axis L of the plugged honeycomb body 100 and the optical axis OP of the lens 304 is less than or equal to a selected angle, such as 20°.

Figure 5:
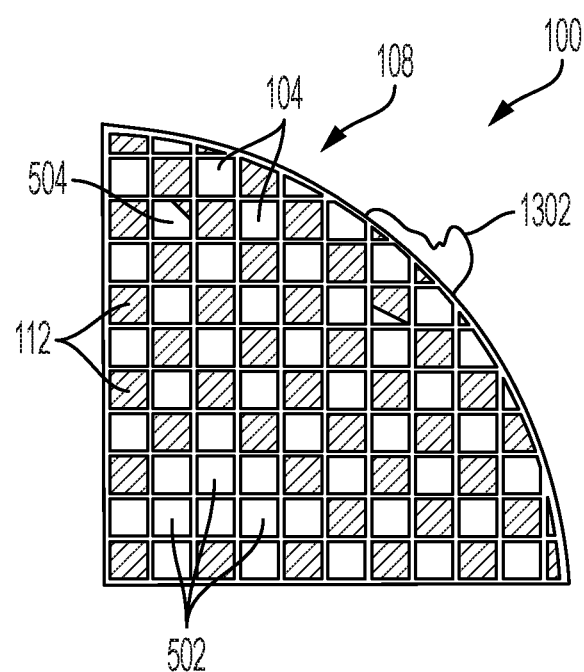
FIG. 5 is an example of a directly illuminated image of a portion of a plugged honeycomb body taken by an imaging apparatus in accordance with an embodiment.

In some example embodiments, the apparatus comprises the second light source 310. Incorporating the second light source 310 into the imaging apparatus 300 adds functionality to the apparatus by allowing directly illuminated images of the plugged honeycomb body 100 to be captured by camera 302 (in addition to the backlit images provides by the first light source 308, as described above). Providing directly illuminated images in addition to backlit images enables multiple different inspections of the plugged honeycomb body 100 to be conducted with the apparatus. In some embodiments, the multiple different inspections are conducted simultaneously and/or without moving the plugged honeycomb body 100 relative to the lens 304. The directly illuminated images can be used to identify extra plugs, cement smears, goobers, and in some instances to measure physical attributes of the plugged honeycomb body 100 and/or any defects. FIG. 5 illustrates one example of a directly illuminated image of a portion of a plugged honeycomb body, which is described in more detail below.

The second light source 310 is disposed on the first side of the plugged honeycomb body 100, i.e., the same side of the honeycomb body 100 as the camera 302 and the lens 304. That location allows the second light source 310 to directly illuminate the end face of the plugged honeycomb body 100 closest to the lens 304. The second light source 310 is disposed adjacent the lens 304 and can be coupled to the lens 304. The second light source 310 can be a high intensity monochromatic ring light that is generally annular and that circumscribes the optical axis OP (and the field of view) of the lens 304 (e.g., thereby not hindering operation of the lens 304). The second light source 310 can be constructed from a plurality of light sources, such as light-emitting diodes (LED) distributed around a frame that emit uniform monochromatic light, such as monochromatic green light.

Figure 6:
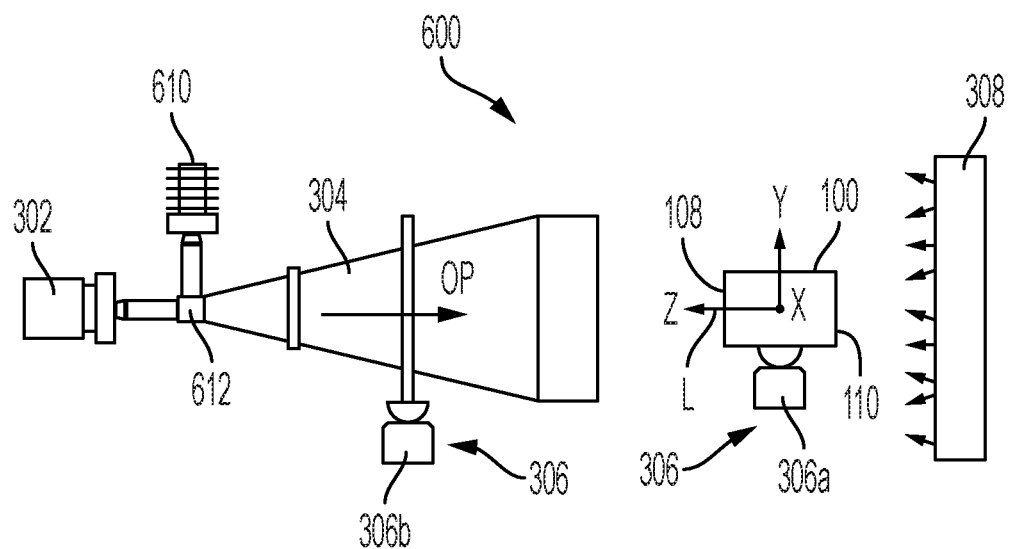
FIGS. 6-10 are side views of example apparatuses for imaging a plugged honeycomb body in accordance with embodiments disclosed herein.

Additional embodiments of an apparatus for imaging a plugged honeycomb body will be described with reference to FIGS. 6-10. The embodiments provide different configurations of components to provide additional advantages and functionality. Referring to FIG. 6, an apparatus 600 for imaging a plugged honeycomb body 100 that incorporates an alternative construction of a second light source will be described. Apparatus 600 comprises the camera 302, the lens 304, the actuator 306, the first light source 308, a second light source 610, and a beam splitter 612. The camera 302, lens 304, actuator 306, and first light source 308 are components that were also incorporated in the previously described embodiments and will not be described in further detail.

In the illustrated embodiment, the second light source 610 comprises an alternative construction for the previously described ring light. The second light source 610 is disposed on the first side of the plugged honeycomb body 100. The imaging apparatus 600 utilizes the lens 304 to direct light emitted from the second light source 610 toward the face on the first end 108 of the plugged honeycomb body 100 to directly illuminate the plugged honeycomb body 100. The second light source 610 is optically coupled to the lens 304 so that the lens 304 is interposed between the second light source 610 and the plugged honeycomb body 100. The second light source 610 can be constructed as a focused monochromatic light source, such as a monochromatic LED light source.

The beam splitter 612 is employed by imaging apparatus 600 so that the camera 302 and the second light source 610 can utilize the optics of lens 304. The beam splitter is an optical device that splits a beam of light into two beams of light. In the present embodiment, the beam splitter 612 is optically interposed between the camera 302 and the lens 304, and between the second light source 610 and the lens 304. Accordingly, the beam splitter 612 enables the second light source 610 to directly illuminate the plugged honeycomb body 100 while simultaneously enabling the camera 302 to collect image data of the plugged honeycomb body 100. In an example, the beam splitter 612 can be a dichroic beam splitter having optical properties selected to alter the ratio of reflection to transmission of preselected wavelengths of light.

Figure 7:
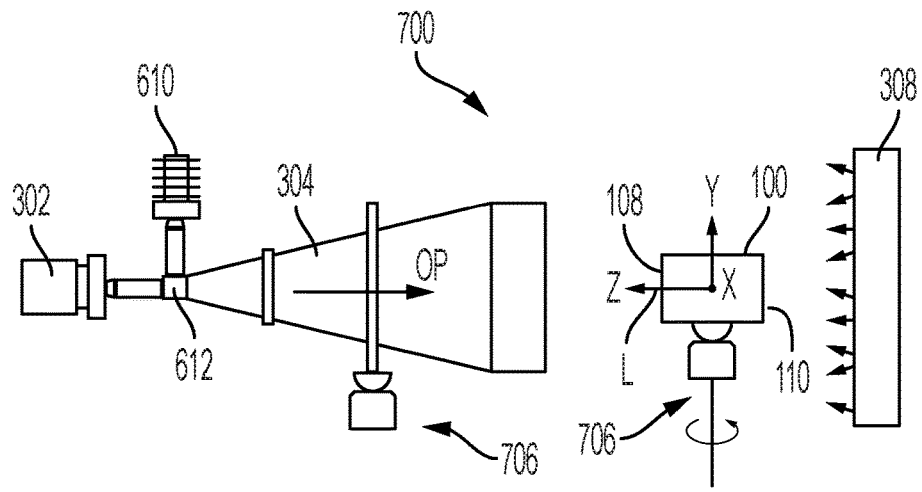

Referring now to FIG. 7, an apparatus 700 for imaging a plugged honeycomb body 100 that is configured to rotate the plugged honeycomb body 100 between a first orientation and a second orientation and to image the plugged honeycomb body 100 in each orientation will be described. In particular, imaging apparatus 700 is configured so that the plugged honeycomb body 100 can be oriented having each of the first end 108 and the second end 110 disposed on the side closest to the camera 302 and lens 304 for imaging. Imaging apparatus 700 comprises the camera 302, the lens 304, an actuator 706, the first light source 308, the second light source 610, and the beam splitter 612. The camera 302, lens 304, first light source 308, second light source 610 and beam splitter 612 are components that were also incorporated in the previously described embodiments and will not be described in further detail.

Actuator 706 is configured to provide rotation of the plugged honeycomb body 100 about an axis of rotation that is parallel to the Y-axis shown in FIG. 7. By providing that axis of rotation, the system is configured to collect image data having the plugged honeycomb body 100 oriented at different angles while being backlit by the first light source 308 and while being directly illuminated by the second light source 610. Actuator 706 can be a rotating table that is mounted on a multi-axis stage. In an example embodiment, the multi-axis stage is configured to translate the plugged honeycomb body in directions parallel to the X and Y axes shown in FIG. 7, and the rotating table is configured to rotate the plugged honeycomb body into at least the first orientation and the second orientation. In the first orientation, the first end 108 of the plugged honeycomb body 100 is positioned closest to the lens 304, and the longitudinal axis L of the plugged honeycomb body 100 is aligned to be substantially parallel to the optical axis OP of the lens 304. In the second orientation, the second end 110 of the plugged honeycomb body 100 is positioned closest to the lens 304, and the longitudinal axis L of the plugged honeycomb body 100 is aligned to be substantially parallel to the optical axis OP of the lens 304.

Both backlit and directly illuminated images can be captured when the plugged honeycomb body 100 is in each of the first orientation and the second orientation. For example, the plugged honeycomb body 100 can be positioned in the first orientation by the actuator 706. The plugged honeycomb body 100 can be illuminated by the first light source 308 with the second light source 610 off, and a backlit image of the plugged honeycomb body 100 captured. A directly illuminated image can then be captured by turning the first light source 308 off and illuminating the plugged honeycomb body 100 with the second light source 610 and capturing image data with the camera 302. The plugged honeycomb body 100 can then be rotated into the second orientation (e.g., substantially 180° so that the end face 110 faces the lens 304 instead of the end face 108) and sequentially illuminated by the first and second light sources 308 and 610 and imaged. The actuator 706 providing rotation of the plugged honeycomb body 100 can be substituted into any of the disclosed embodiments.

Figure 8:
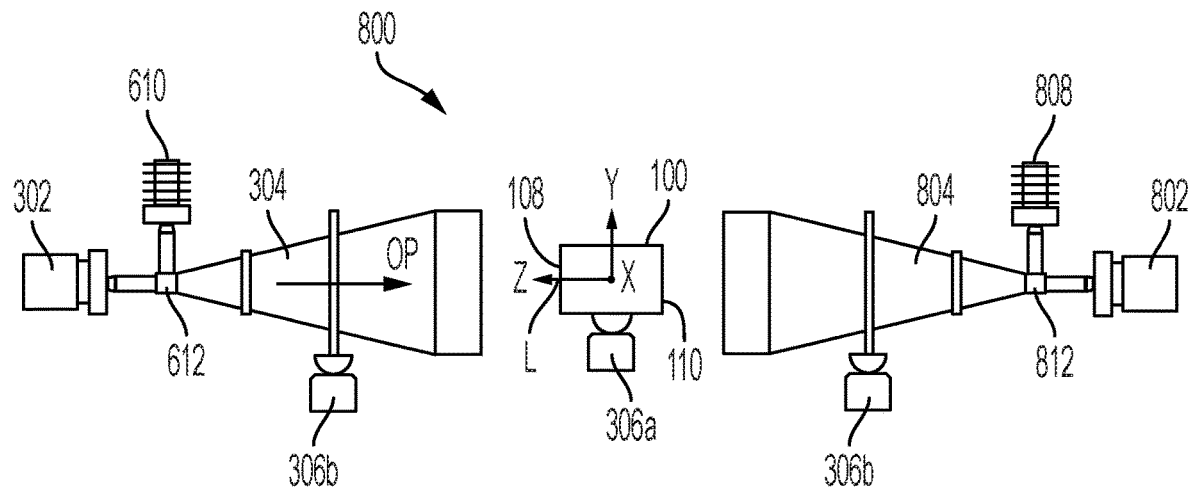

Referring now to FIG. 8, an apparatus 800 for imaging a plugged honeycomb body 100 that is configured to capture directly illuminated and backlit images of opposite ends of the plugged honeycomb body 100 without requiring the honeycomb body 100 to be moved or reoriented will be described. Imaging apparatus 800 comprises a plurality of cameras, lenses and light sources, with those components being disposed on opposite sides of the plugged honeycomb body 100. Imaging apparatus 800 comprises the camera 302 ("first camera"), a second camera 802, the lens 304 ("first lens"), a second lens 804, the actuator 306, a first light source 808, the second light source 610, the first beam splitter 612, and a second beam splitter 812. The camera 302, lens 304, actuator 306, first light source 308, second light source 610 and beam splitter 612 are components that were also incorporated in the previously described embodiments and will not be described in further detail.

The second camera 802 is disposed on a second side of the plugged honeycomb body 100 and is configured to capture images of the plugged honeycomb body 100. The second camera 802 is disposed on the second side of the plugged honeycomb body 100, which is opposite from the first camera 302, so that images can be taken of both ends of the plugged honeycomb body. The second camera 802 can be a digital camera that is configured to record digital image data corresponding to the plugged honeycomb body 100. The digital image data is based at least in part on an image of the plugged honeycomb body 100 that passes through the second lens 804 and is projected onto a digital image sensor in the second camera 802. Second camera 802 can be configured to collect monochromatic or multi-color image data. Exemplary digital cameras that can be employed are the Dalsa Falcon 4, 86 MP digital camera; and the Prosilica GT 6600 28.8 MP digital camera. In an example embodiment, the second camera 302 has a resolution relating to a physical dimension of the plugged honeycomb body 100 that corresponds to approximately 20-50 µm per pixel, and in another embodiment 30-40 µm per pixel.

The first lens 304 is disposed on the first side of the plugged honeycomb body 100, the second lens 804 is disposed on the second side of the plugged honeycomb body 100, each of lenses 304 and 804 defines an optical axis OP, and the optical axes OP can be aligned with each other. The second lens 804 is optically coupled to the second camera 802, and interposed between the second camera 802 and the plugged honeycomb body 100. A lens having parallax distortion of less than 0.3% in at least a portion of a field of view can be utilized for the second lens 804. In some example embodiments, the second lens 804 can be configured to have parallax distortion less than 0.1% in at least a portion of the field of view of the second lens 804. The second lens 804 can be a telecentric lens.

Similar to the second light source 610, the first light source 808 can be constructed as a focused monochromatic light source. The second light source 610 808 is disposed on the second side of the plugged honeycomb body 100. The imaging apparatus 800 utilizes the lens 804 to direct light emitted from the first light source 808 toward the face on the second end 110 of the plugged honeycomb body 100 to directly illuminate the plugged honeycomb body 100. The first light source 808 is optically coupled to the second lens 804 so that the second lens 804 is interposed between the first light source 808 and the plugged honeycomb body 100. The first light source 808 can be constructed as a monochromatic LED light source.

A second beam splitter 812 is incorporated into the imaging apparatus 800. The second beam splitter 812 is optically interposed between the second camera 802 and the second lens 804, and between the first light source 808 and the second lens 804. The beam splitter 812 allows the optically coupled light source to illuminate the end of the plugged honeycomb body 100 while simultaneously allowing the optically coupled camera to collect image data of the illuminated end of the plugged honeycomb body 100. In an example, the beam splitter 812 can be a dichroic beam splitter having optical properties selected to alter the ratio of reflection to transmission of preselected wavelengths of light.

As noted above, the imaging apparatus 800 is configured so that directly illuminated and backlit images of both ends of the plugged honeycomb body 100 can be captured without requiring that the plugged honeycomb body 100 be moved or reoriented. For example, with the plugged honeycomb body 100 oriented so that the first end 108 of the plugged honeycomb body 100 is closest to the first lens 304, and only the first light source 808 illuminating the plugged honeycomb body 100, a backlit image of the plugged honeycomb body 100 can be captured from the first side with the first camera 302. Simultaneously, a directly illuminated image of the second end 110 of the plugged honeycomb body 100 can be captured with the second camera 802. Without moving the plugged honeycomb body 100, and with only the second light source 610 illuminating the plugged honeycomb body 100, a backlit image of the plugged honeycomb body 100 can be captured from the second side with the second camera 802, while a directly illuminated image of the first end 108 of the plugged honeycomb body 100 can be captured with the first camera 302.

Figure 9:
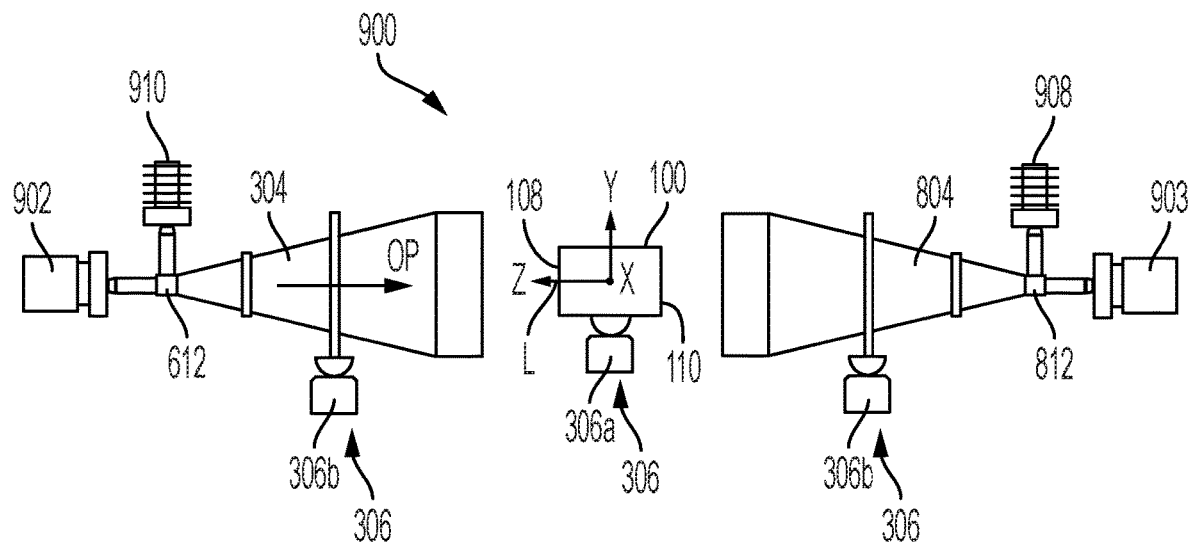

Referring now to FIG. 9, an apparatus 900 for imaging a plugged honeycomb body 100 that is configured to simultaneously capture directly illuminated and backlit images of opposite ends of the plugged honeycomb body 100 without requiring the honeycomb body 100 to be moved or reoriented will be described. Imaging apparatus 900 can comprise a plurality of cameras, lenses and light sources, with those components being disposed on opposite sides of the plugged honeycomb body 100. Imaging apparatus 900 comprises a first multi-color camera 902, a second multi-color camera 903, the first lens 304, the second lens 804, the actuator 306, a first light source 908, a second light source 910, the first beam splitter 612, and the second beam splitter 812. The first lens 304, the second lens 804, the actuator 306, the first beam splitter 612, and the second beam splitter 812 are components that were also incorporated in the previously described embodiments and will not be described in further detail.

The first multi-color camera 902 is disposed on a first side of the plugged honeycomb body 100 and is configured to capture images of the plugged honeycomb body 100. The first multi-color camera 902 is optically coupled to the first lens 304 through beam splitter 612. The first multi-color camera 902 can be a digital camera that is configured to record digital image data corresponding to the plugged honeycomb body 100. The digital image data is based at least in part on an image of the plugged honeycomb body 100 that passes through the first lens 304 and is projected onto a digital image sensor in the first multi-color camera 902. In the present embodiment, an image sensor of the first multi-color camera 902 comprises pixels configured to capture light defined by a first wavelength and light defined by a second wavelength that is different than the first wavelength, so that different wavelengths of light can be captured simultaneously.

The second multi-color camera 903 is disposed on a second side of the plugged honeycomb body 100 and is configured to capture images of the plugged honeycomb body 100. The second multi-color camera 903 is optically coupled to the second lens through beam splitter 812. The second multi-color camera 903 can be a digital camera that is configured to record digital image data corresponding to the plugged honeycomb body 100. The digital image data is based at least in part on an image of the plugged honeycomb body 100 that passes through the second lens 804 and is projected onto a digital image sensor in the second multi-color camera 903. In the present embodiment, an image sensor of the second multi-color camera 903 comprises pixels configured to capture light defined by the first wavelength and light defined by the second wavelength, so that the different wavelengths of light can be captured simultaneously.

The first light source 908 can be constructed as a focused monochromatic light source that emits light defined by the first wavelength. The first light source 908 is disposed on the second side of the plugged honeycomb body 100. The imaging apparatus 900 utilizes the second lens 804 to direct light emitted from the first light source 908 toward the face on the second end 110 of the plugged honeycomb body 100 to directly illuminate the plugged honeycomb body 100. The first light source 908 is optically coupled to the second lens 804 so that the second lens 804 is interposed between the first light source 908 and the plugged honeycomb body 100. The first light source 808 can be constructed as a monochromatic LED light source, such as a monochromatic red LED light source.

The second light source 910 can also be constructed as a focused monochromatic light source that emits light defined by the second wavelength. The second light source 910 is disposed on the first side of the plugged honeycomb body 100. The imaging apparatus 900 utilizes the first lens 304 to direct light emitted from the second light source 910 toward the face on the first end 108 of the plugged honeycomb body 100 to directly illuminate the plugged honeycomb body 100. The second light source 910 is optically coupled to the first lens 304 so that the first lens 304 is interposed between the second light source 910 and the plugged honeycomb body 100. The second light source 910 can be constructed as a monochromatic LED light source, such as a monochromatic blue LED light source.

Similar to previous embodiments, beam splitters are incorporated to optically couple a camera and a light source to a single lens. As illustrated, the first beam splitter 612 is optically interposed between the first multi-color camera 902 and the first lens 304, and between the second light source 910 and the first lens 304. Similarly, the second beam splitter 812 is optically interposed between the second multi-color camera 903 and the second lens 804, and between the first light source 908 and the second lens 804. Each of the beam splitters enables the optically coupled light source to illuminate the end of the plugged honeycomb body 100 closest to it while simultaneously enables the optically coupled camera to collect image data of the illuminated end of the plugged honeycomb body 100.

As noted above, imaging apparatus 900 is configured to simultaneously capture directly illuminated and backlit images of opposite ends of the plugged honeycomb body 100 without requiring the honeycomb body 100 to be moved or reoriented. The combination of light sources emitting light defined by different wavelengths and the ability of each multi-color camera to record data corresponding to the different wavelengths of light enables the images to be captured simultaneously. For example, with both the first light source 908 and the second light source 910 simultaneously illuminating the plugged honeycomb body 100, the first multi-color camera 902 and the second multi-color camera 903 can capture respective images of the plugged honeycomb body 100. The image data captured by each of the cameras can be dissected based on the different wavelengths to form two images, each image corresponding to one of the two wavelengths of light. In particular, the image data collected by the first multi-color camera 902 can be dissected into a backlit image corresponding to light defined by the first wavelength and emitted by the first light source 908, and a directly illuminated image corresponding to light defined by the second wavelength and emitted by the second light source 910. The image data collected by the second multi-color camera 903 can be dissected into a backlit image corresponding to light defined by the second wavelength and emitted by the second light source 910, and a directly illuminated image corresponding to light defined by the first wavelength and emitted by the first light source 908. After dissecting the image data, four images are constructed including backlit and directly illuminated images from both sides of the plugged honeycomb body 100.

Figure 10:
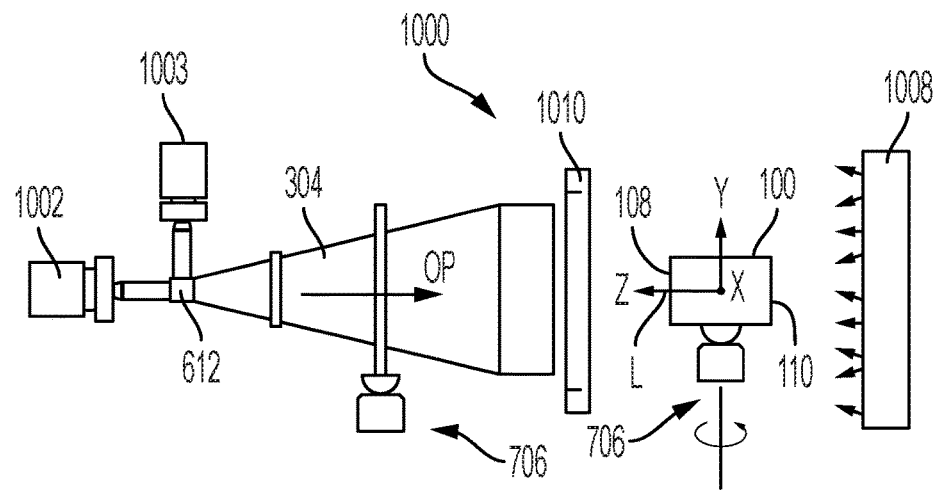

Referring now to FIG. 10, an apparatus 1000 for imaging a plugged honeycomb body 100 that is configured to simultaneously capture directly illuminated and backlit images of the plugged honeycomb body 100 from one side simultaneously (i.e., without requiring that the light sources be operated to sequentially illuminate the plugged honeycomb body 100) will be described. Imaging apparatus 1000 comprises a first camera 1002, a second camera 1003, the first lens 304, the actuator 706, a first light source 1008, a second light source 1010, and the beam splitter 612. The first lens 304, the actuator 706, and the beam splitter 612 are components that were also incorporated in the previously described embodiments and will not be described in further detail.

The first camera 1002 is disposed on a first side of the plugged honeycomb body 100 and is configured to capture images of the plugged honeycomb body 100. The first camera 1002 is optically coupled to the first lens 304 through beam splitter 612. The first camera 1002 can be a monochromatic or multi-color digital camera that is configured to record digital image data corresponding to the plugged honeycomb body 100. The digital image data is based at least in part on an image of the plugged honeycomb body 100 that passes through the first lens 304 and is projected onto a digital image sensor in the first camera 1002. The image sensor of the first camera 1002 comprises pixels configured to capture light defined by at least a first wavelength.

The second camera 1003 is also disposed on the first side of the plugged honeycomb body 100 and is configured to capture images of the plugged honeycomb body 100. The second camera 1003 is also optically coupled to the first lens 304 through beam splitter 612. The second camera 1003 can be a monochromatic or multi-color digital camera that is configured to record digital image data corresponding to the plugged honeycomb body 100. The digital image data is based at least in part on an image of the plugged honeycomb body 100 that passes through the first lens 304 and is projected onto a digital image sensor in the second camera 1003. The image sensor of the second camera 1003 comprises pixels configured to capture light defined by at least a second wavelength that is different than the first wavelength.

The first light source 1008 is disposed on a second side of the plugged honeycomb body 100 opposite the first side, i.e., on a side of the plugged honeycomb body 100 that is distal of the plugged honeycomb body 100 from the cameras 1002, 1003 and lens 304. The first light source 1008 can be configured to produce diffuse light and to project the diffuse light generally at the plugged honeycomb body 100. The first light source 1008 can be a diffuse light panel directed at the plugged honeycomb body 100 that emits monochromatic light defined by the first wavelength. In an example, the first light source 1008 can emit monochromatic red light.

The second light source 1010 is disposed on the first side of the plugged honeycomb body 100, i.e., the same side of the honeycomb body 100 as the cameras 1002, 1003 and lens 304. That location allows the second light source 1010 to directly illuminate the end face of the plugged honeycomb body 100 closest to the lens 304. The second light source 1010 is disposed adjacent the lens 304 and can be coupled to the lens 304. The second light source 1010 can be a high intensity monochromatic ring light that emits light defined by the second wavelength. For example, the second light source 1010 can emit monochromatic green light.

During operation, the imaging apparatus 1000 can be used to simultaneously capture a directly illuminated image and a backlit image from a side of the plugged honeycomb body 100. For example, both first light source 1008 and second light source 1010 can be turned on to illuminate the plugged honeycomb body 100. The first light source 1008 illuminates the plugged honeycomb body 100 with light defined by the first wavelength, and the second light source 1010 illuminates the plugged honeycomb body 100 with light defined by the second wavelength. Both cameras 1002, 1003 capture an image of the plugged honeycomb body. In an example, the first camera 1002 captures an image corresponding to light defined by the first wavelength and emitted by the first light source 1008 to produce a backlit image of the plugged honeycomb body 100. Simultaneously, the second camera 1003 captures an image corresponding to light defined by the second wavelength and emitted by the second light source 1010 to produce a directly illuminated image of the first end 108 of the plugged honeycomb body 100. If desired, the plugged honeycomb body 100 can be rotated by actuator 706 into a second orientation so that the second end 110 of the plugged honeycomb body 100 can be imaged, and so that a second backlit image from the other side of the plugged honeycomb body 100 can be captured. Although the illustrated embodiments generally show the plugged honeycomb body 100 being supported with the longitudinal axis oriented horizontally, the currently disclosed embodiments are not limited to that configuration and the plugged honeycomb body 100 and imaging apparatus can have any orientation.

Figure 11:
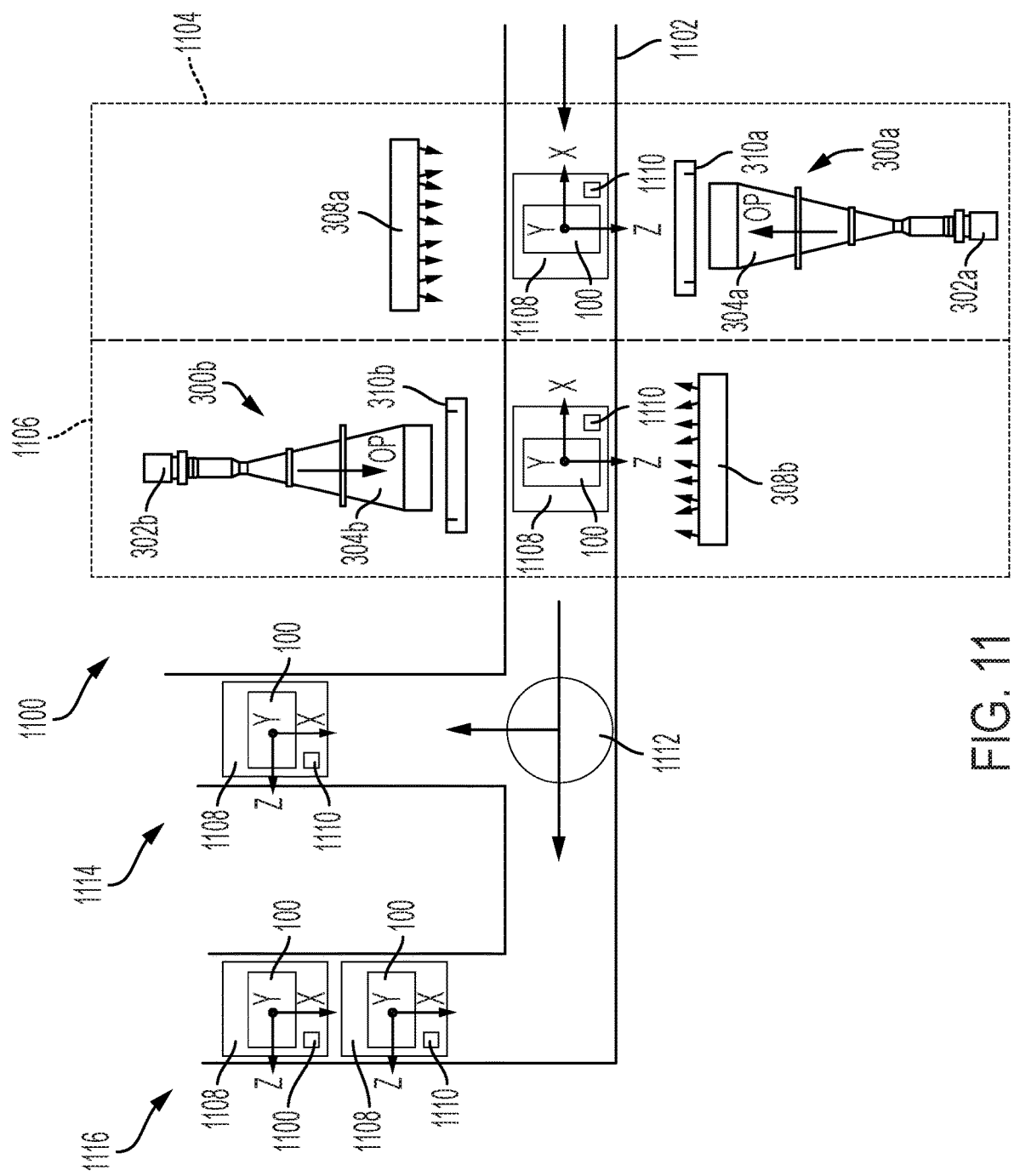
FIG. 11 is a top view of a portion of an example production line that comprises an embodiment of an apparatus for imaging a plugged honeycomb body.

Referring to FIG. 11, an embodiment of a portion of a production line comprising an embodiment of the imaging apparatus will be described. The production line 1100 comprises a material handler 1102, a first inspection station 1104, and a second inspection station 1106. Production line 1100 transports each of a plurality of plugged honeycomb bodies 100, using material handler 1102, through a sequence of operation stations, comprising first and second inspection stations 1104, 1106 where directly illuminated and backlit images of the plugged honeycomb bodies 100 are captured from each side of the plugged honeycomb body 100 and analyzed. The analysis of the captured images provides information that can be used for sorting the plurality of plugged honeycomb bodies. The exemplary production line can be capable of inspecting greater than or equal to 250 parts per hour, in another embodiment greater than or equal to 350 parts per hour, and in a still further embodiment greater than or equal to 500 parts per hour.

The material handler 1102 is a transportation mechanism, such as a conveyor, that transports plugged honeycomb bodies 100 sequentially through series of operation stations. The operation stations can comprise first inspection station 1104, second inspection station 1106, and a sorting station 1112 that can be used to direct each plugged honeycomb body 100 to one of a plurality of paths 1114, 1116 based on image data and analysis, such as a repair spur, a dryer spur, or a scrap bin. Each of the plugged honeycomb bodies 100 can be fixtured on a tray 1108 that allows the material handler 1102 to manipulate the position of the plugged honeycomb body 100. Each tray 1108 is configured to support an associated plugged honeycomb body 100 in a predetermined orientation and position relative to the tray 1108, and in a predetermined orientation relative to the material handler 1102. Each tray 1108 can be designated by indicia 1110 that can provide orientation information and/or a unique identifier. Additionally, or as an alternative, each plugged honeycomb body 100 can comprise a unique identifier that allows data collected during inspection to be correlated to a particular plugged honeycomb body 100.

The first inspection station 1104 comprises an imaging apparatus according to one of the previously described embodiments, and also can comprise at least one processor for analyzing the images captured and/or generating at least one display to provide information to an operator. In the illustrated example, an imaging apparatus 300a identical to that shown in FIG. 3 is included. Imaging apparatus 300a comprises a camera 302a, a lens 304a, an actuator (not shown), a first light source 308a, and a second light source 310a. Each of the components has the same construction and configuration as the components having the same reference numbers described above with respect to imaging apparatus 300 and will not be described in greater detail.

The imaging apparatus 300a is oriented relative to the material handler 1102 to capture images of a plugged honeycomb body 100 supported by a tray 1108. In particular, the imaging apparatus 300a is oriented so that it is configured to capture directly illuminated images of a first end 108 of a plugged honeycomb body 100. The orientation also allows imaging apparatus 300a to capture a backlit image of the plugged honeycomb body 100 using light emitted by first light source 308a disposed on a second side of the plugged honeycomb body 100 adjacent a second end 110.

The second inspection station 1106 also comprises an imaging apparatus according to one of the previously described embodiments, such as imaging apparatus 300b, as shown. Imaging apparatus 300b comprises a camera 302b (i.e., a second camera in the production line), a lens 304b (i.e., a second lens in the production line), an actuator (not shown), a first light source 308b (i.e., a third light source in the production line), and a second light source 310b (i.e., a fourth light source in the production line). Each of the components has the same construction and configuration as the components having the same reference numbers described above with respect to imaging apparatus 300 and will not be described in greater detail.

The imaging apparatus 300b of the second inspection station 1106 has a second orientation relative to the material handler 1102. The second orientation of the imaging apparatus 300b is opposite of the orientation of imaging apparatus 300a of the first inspection station 1104 so that it is effectively a mirror image. That mirrored orientation allows the imaging apparatus 300b to capture directly illuminated images of a second end 110 of a plugged honeycomb body 100. The orientation also allows imaging apparatus 300b to capture a backlit image of the plugged honeycomb body 100 using light emitted by first light source 308b disposed on a second side of the plugged honeycomb body 100 adjacent the first end 108 of the plugged honeycomb body 100. An inspection station comprising an imaging apparatus that is capable of capturing directly illuminated images of both ends of a plugged honeycomb body 100, and backlit images from both sides, can be substituted for the first and second inspection stations illustrated in production line 1100.

Figure 12:
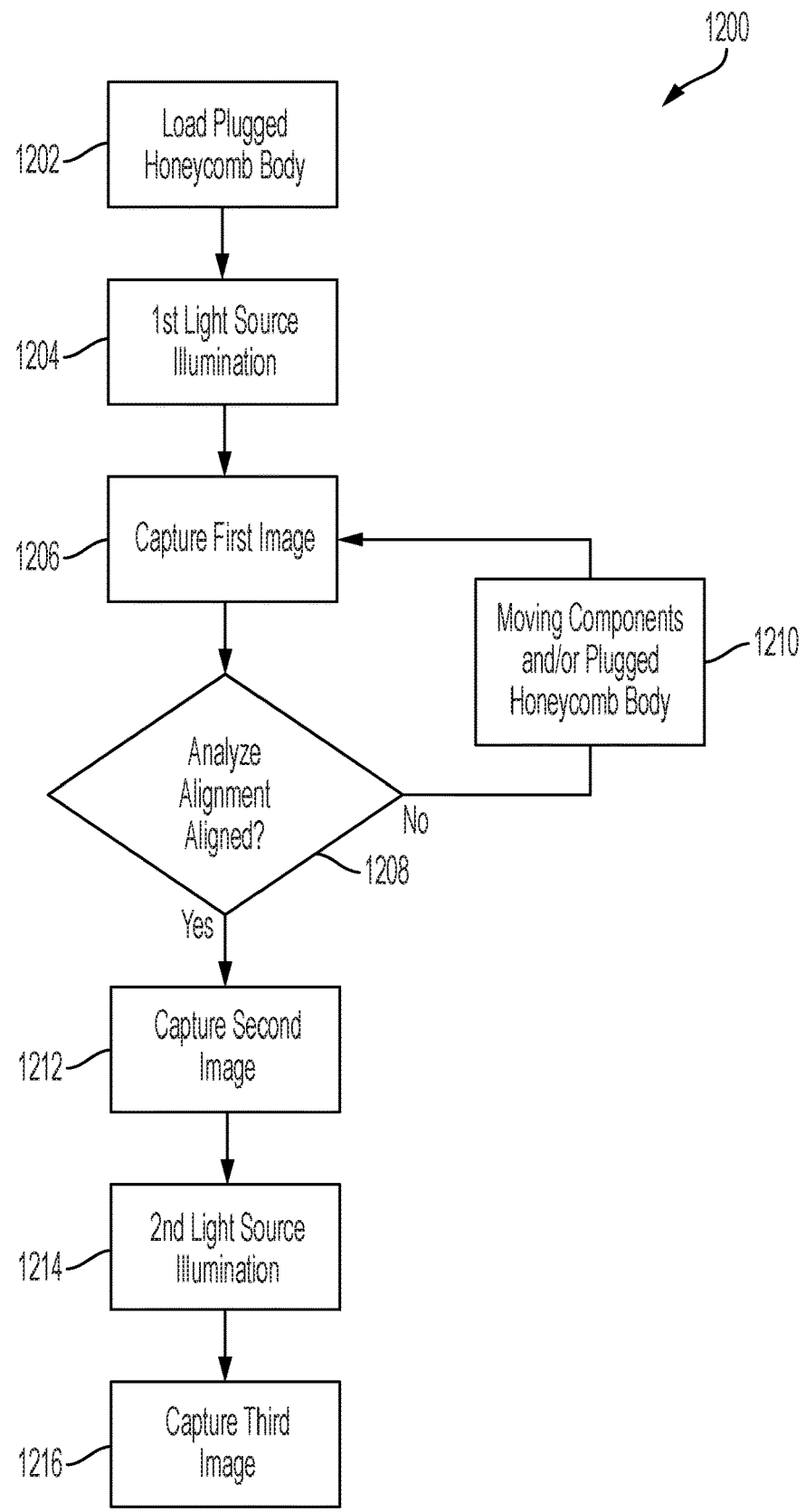
FIG. 12 depicts a flowchart of an example method for inspecting a plugged honeycomb body in accordance with an embodiment.

FIG. 12 depicts a flowchart 1200 of an example method for inspecting a plugged honeycomb body 100 in accordance with an embodiment. Flowchart 1200 can be performed using any of the embodiments of the imaging apparatuses 300, 600, 700, 800, 900, and 1000 shown in respective FIGS. 3, and 6-10, for example. Further structural and operational embodiments will be apparent to persons skilled in the relevant art(s) based on the discussion regarding the flowchart 1200.

As shown in FIG. 12, the method of flowchart 1200 begins at step 1202. In step 1202, a plugged honeycomb body is loaded into an imaging station. In an example embodiment, loading the plugged honeycomb body at step 1202 comprises loading a plugged honeycomb body into an imaging station which comprises a first camera, a first lens, an actuator, a first light source, and a second light source. The first camera is disposed on a first side of the plugged honeycomb body. The first lens is optically coupled to the first camera. The actuator is configured to move at least one of the first camera, the first lens, or the plugged honeycomb body. The first light source is disposed on a second side of the plugged honeycomb body. The second light source is disposed on the first side of the plugged honeycomb body.

The plugged honeycomb body 100 can be loaded into an imaging station 1202 manually or by an automated system. For example, an operator or a robot can be used to place the plugged honeycomb body 100 on a fixture that is positioned in the imaging station on an actuator. In another example, the plugged honeycomb body 100 can be on a tray that is transported into an inspection station by a material handler, such as the material handler 1102 that is part of production line 1100 of FIG. 11. When the tray is located in the imaging station, an actuator can be used to lift the tray from a conveyor so that the plugged honeycomb body 100 is generally in front of a lens comprised by the imaging apparatus.

At step 1204, the plugged honeycomb body 100 is illuminated with a first light source. In an example embodiment, illuminating the plugged honeycomb body at step 1204 comprises illuminating the plugged honeycomb body with light from the first light source to form a profile corresponding to the plugged honeycomb body on the first lens (e.g., the profile 405). The plugged honeycomb body obstructs a portion of the light that illuminates the plugged honeycomb body to project the profile on the first lens. As described above, the first light source is disposed on a side of the plugged honeycomb body 100 opposite the camera so that the plugged honeycomb body 100 is backlit. In an example embodiment, the first light source 308, 808, 908, 1008 illuminates the plugged honeycomb body 100.

At step 1206, a first image is captured. In an example embodiment, capturing the first image at step 1206, comprises capturing a first image of the profile corresponding to the plugged honeycomb body with the first camera. In an example embodiment, the first image is a backlit image, such as that shown in FIG. 4. The backlit image generally forms an image of the profile that is projected by the plugged honeycomb body 100 on the lens. In an example embodiment, the first camera 302, 902, 1002 captures the first image.

At step 1208, the first image is analyzed to determine whether alignment of the honeycomb body satisfies one or more criteria (e.g., a predefined alignment tolerance). If the alignment of the honeycomb body does not satisfy the one or more criteria (e.g., there is misalignment that exceeds the predefined alignment tolerance), flow continues to step 1210. If the alignment of the honeycomb body satisfies the one or more criteria, flow continues to step 1212.

In an example embodiment, analyzing the first image at step 1208 comprises analyzing the imaged profile of the honeycomb body to determine misalignment of a longitudinal axis L of the plugged honeycomb body relative to an optical axis OP of the first lens, such as lens 304. In an example embodiment, the analysis comprises analyzing a light intensity change around the periphery of a profile corresponding to the plugged honeycomb body 100. The geometry, i.e., size and shape, of the profile changes based on the alignment between the longitudinal axis L of the plugged honeycomb body 100 and the optical axis OP of the first lens. The size and shape of the profile can be analyzed using a processor or by an operator by making measurements of the profile or comparing the shape to a predetermined shape corresponding to an optimally aligned condition. Because of the low distortion provided by the imaging apparatus embodiments described above, misalignment within a predefined alignment tolerance can be maintained between the components while still allowing accurate plug inspection. In an example embodiment, the predefined alignment tolerance can be misalignment between the axes of less than or equal to 5°. In another example embodiment, the predefined alignment tolerance can be misalignment of less than or equal to 2°.

At step 1210, one or more of the components of the imaging apparatus and/or the plugged honeycomb body are moved. In an example embodiment, step 1210 comprises moving the actuator to correct misalignment of the longitudinal axis of the plugged honeycomb body relative to the optical axis OP of the first lens by aligning the optical axis OP of the first lens and the longitudinal axis L of the plugged honeycomb body so that the optical axis OP of the first lens and the longitudinal axis L of the plugged honeycomb body are substantially parallel. As described above, the imaging apparatus comprises an actuator that provides relative movement between the plugged honeycomb body 100 and components of the imaging apparatus. Based on the alignment analysis, the actuator can be used to correct misalignment between the longitudinal axis L of the plugged honeycomb body and the optical axis OP of the lens until those two axes are substantially parallel. In an example embodiment, the actuator 306, 706 is used to move one or more of the components of the imaging apparatus and/or the plugged honeycomb body.

Figure 13:
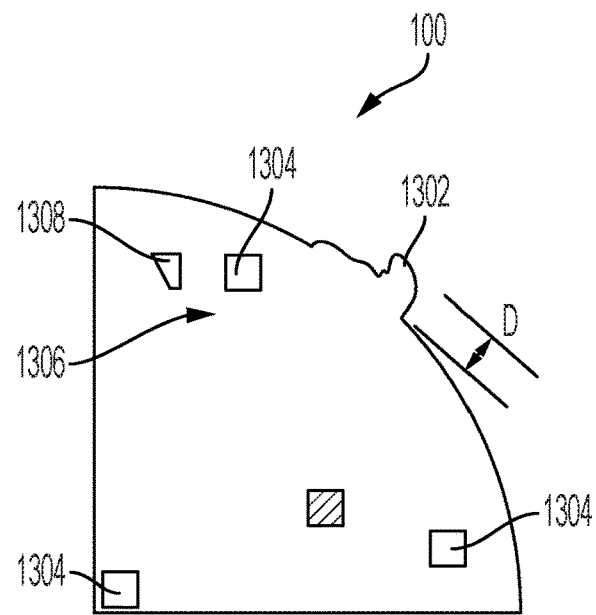
FIG. 13 is an example of a backlit image of a portion of a plugged honeycomb body taken by an imaging apparatus in accordance with an embodiment.

At step 1212 (e.g., after the honeycomb body is aligned within the predefined alignment tolerance), a second image is captured. In an example embodiment, capturing the second image at step 1212 comprises capturing a second image of the plugged honeycomb body with the first camera. The second image is also a backlit image and can be used to identify leaks in the plugged honeycomb body 100. In an example embodiment, the first camera 302, 902, 1002 is used to capture the second image. FIG. 13 is one example of a second image that can be captured at step 1212. The second image in FIG. 13 is depicted as a backlit image of a portion of a plugged honeycomb body 100 that includes leaks and other defects. Alternatively, if it is determined that the plugged honeycomb body 100 as initially loaded is acceptably aligned, the first image can suffice for both the first and second images.

The backlit images can be utilized to identify and analyze defects, such as goobers and leaks. Goobers 1302 are formed when excess plugging material is present on the perimeter skin of the plugged honeycomb body 100. Goobers 1302 present themselves as deviations extending outward from the perimeter shape of the profile formed by the plugged honeycomb body 100 in the backlit images. Leaks are defects where a portion of the plugged honeycomb body 100 is intended to be, but is not plugged sufficiently to block the flow of working fluid therethrough. A leak can be formed as a missing plug 1304, a hole in a plug 1306, or a missing partial plug 1308. Leaks present themselves as brighter spots in the profile formed by the plugged honeycomb body 100 in the backlit images. In some instances, a leak will show in the backlit image as a brighter spot that can indicate only partial blockage. Because of the low distortion provided by the imaging apparatus embodiments, the defects can be measured in the backlit images, such as by comparing the measured defect to a measurement of another physical attribute of the plugged honeycomb body 100, or an imaged portion of fixturing, having a known dimension. In an example embodiment, leaks as small as 250 μm can be identified and measured. In another example embodiment, leaks as small as 125 μm can be identified and measured. In yet another example embodiment, the imaging apparatus permits unplugged peripheral cells to be measured.

Figure 14:
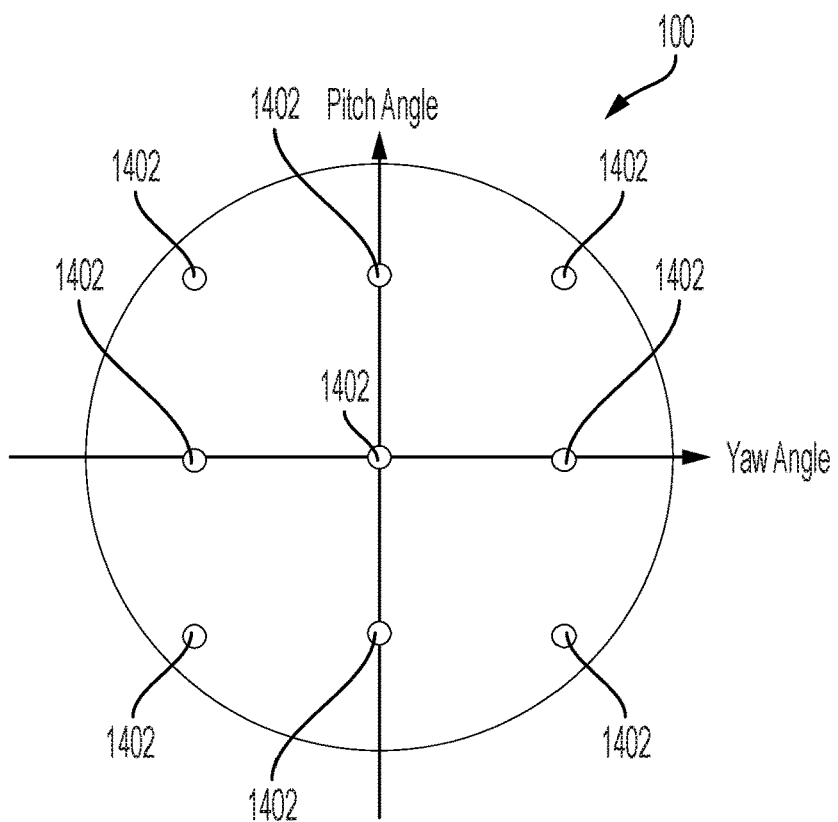
FIG. 14 is a front view of a plugged honeycomb body illustrating example inspection targets in accordance with an embodiment.

In still another example embodiment, capturing the second image at step 1212 comprises capturing a plurality of images of the plugged honeycomb body 100 over a predefined scan region after alignment. As one example, the plugged honeycomb body 100 and the components of the imaging apparatus are held stationary relative to translation along any axis, but the lens can be tilted to change the pitch angle and/or the yaw angle. For instance, the pitch angle and the yaw angle can be altered to provide a plurality of predefined inspection angles, and an image can be captured with the lens oriented in each predefined inspection angle. In an example embodiment, the optical axis OP of the lens intersects the plugged honeycomb body at an inspection target 1402 in each predefined inspection angle, shown in FIG. 14, and an image is taken. The plurality of images provides varying angular perspective of the plugged honeycomb body 100, which can assist in identifying some defects. Any number and location of inspection targets 1402 can be selected. In an example, nine inspection targets are used. Additionally, the pitch and yaw angles can differ between inspection targets 1402 by any amount. In an example, the inspection targets 1402 differ by increments of 0.25° in pitch and yaw angle.

In another example, a plurality of images of the plugged honeycomb body 100 are captured over a predefined scan region by translating the components and/or the plugged honeycomb body 100 while keeping the longitudinal axis L of the honeycomb body substantially parallel to the optical axis OP of the lens. In an example embodiment, the parts are translated so that the optical axis OP intersects the plugged honeycomb body 100 at each of the inspection targets 1402 and an image is captured.

At step 1214, the plugged honeycomb body 100 is illuminated with a second light source to directly illuminate a portion of the plugged honeycomb body 100. For example, the second light source can be used to directly illuminate an end face closest to the camera of the imaging apparatus. illumination of the plugged honeycomb body 100 by the second light source can be performed in sequence or simultaneously with illumination by the first light source as described above with respect to the imaging apparatus embodiments. In an example embodiment, the second light source 310, 610, 910, 1003 illuminates the plugged honeycomb body 100.

At step 1216, a third image of the plugged honeycomb body is captured. In an example embodiment, capturing the third image at step 1216 comprises capturing the third image of the plugged honeycomb body with the first camera. In an example embodiment, the first camera 302, 902, 1002 captures the third image. FIG. 5 illustrates one example of a portion of a directly illuminated third image of a plugged honeycomb body 100 that includes plug defects. The backlit and directly illuminated images of the plugged honeycomb body 100 can be captured in sequence or simultaneously as described above with respect to the imaging apparatus embodiments.

Referring back to FIG. 5, the directly illuminated images described herein can be utilized to identify and analyze defects, such as extra plugs 502, partial plugs 504, and goobers 1302. An extra plug 502 is created when extra plug material is present in a cell opening that is not designed to be plugged, i.e., a non-designed plug. In some example embodiments, extra plug material will be designated as an extra plug 502 if the extra plug material is blocking 50% or more of the cell opening that is not designed to be plugged. A smear is formed when a plurality of extra plugs 502 are disposed adjacent each other, i.e., they touch each other or are separated by a designed plug. Because of the low distortion provided by the imaging apparatus embodiments, the defects can be measured in the directly illuminated images, such as by comparing the measured defect to a measurement of another physical attribute of the plugged honeycomb body 100, or an imaged portion of fixturing, having a known dimension. Additionally, the backlit and directly illuminated images can be used in combination to analyze a single defect, such as a defect that has different dimensions when viewed from each side of the plugged honeycomb body 100.

In an example embodiment, a goober inspection is performed in the method of inspecting a plugged honeycomb body 100, and the goober inspection can be performed before or after alignment of the plugged honeycomb body 100 with the lens. In an aspect of this embodiment, the goober inspection can be performed by capturing a backlit image of the plugged honeycomb body 100. In accordance with this aspect, the backlit image can be analyzed to identify the presence of goobers. For example, the profile of the honeycomb body 100 captured in the backlit image can be compared to an expected, or true, part shape and the deviations are identified and measured. The expected part shape can be formed using a closing operation based on the general shape of the perimeter of the profile formed by the plugged honeycomb body 100. As an example, if the deviations are measured to have a dimension D that exceeds a predetermined threshold, the part can be rejected and sorted for repair or scrap. In another aspect, the goober inspection can be performed incrementally on portions, or regions of interest, of the plugged honeycomb body. The goober inspection can be performed using backlit and/or directly illuminated images of the plugged honeycomb body 100.

The backlit and directly illuminated images are utilized to determine whether the plugged honeycomb body 100 meets pass/fail criteria. For example, in production line 1100, after a plugged honeycomb body 100 is inspected in each of the inspection stations, the plugged honeycomb body 100 is sorted. The parts can be sorted as passing inspection, failing inspection to be repaired, or failing inspection to be scrapped.

Thresholds can be used to determine the sorting of the plugged honeycomb bodies 100, and a different threshold can be applied for each type of defect or for combinations of defects. For example, a threshold for a goober 1302 can be based on the dimension D of the goober 1302. For instance, if the dimension D of the goober 1302 exceeds a dimension threshold, the associated plugged honeycomb body 100 can be sorted as failing inspection to be repaired. The dimension threshold can be 0.16" (i.e., 4 mm), 0.12", 0.08", or any other suitable dimension. As another example, a threshold for leaks formed from open cells can comprise a number or percentage of open cells). In further examples for open cells, the threshold can be limited to only apply to open cells having open area greater than a predefined amount, such as 25% of the full cell area. In a still further example, the threshold can be a ratio of a combined area of the open portions of leaks to the designed plug area. As another example, a threshold for extra plugs or smears can be based on a count of adjacent extra plugs within a predefined area, such as allowing a maximum of 5 non-designed plugs within a 1 in.$^2$ space, or in another embodiment 10 non-designed plugs within a 1 in.$^2$ space, or in another embodiment 20 non-designed plugs within a 1 in.$^2$ space. As a still further example, the imaging apparatus can be used to measure partially plugged cells and unplugged peripheral cells, and a threshold can be applied (e.g., to an area of the opening of the partially plugged cell or unplugged peripheral cell) to determine how to sort the part.

III. Further Discussion of Some Embodiments

In one aspect, an apparatus for imaging a plugged honeycomb body is provided. The apparatus comprises a first camera and a first lens optically coupled to a first camera, the first lens having a field of view; and a first light source disposed opposite the first lens; wherein the plugged honeycomb body can be positioned between the first lens and the first light source such that the field of view encompasses a profile of a first side of the plugged honeycomb body; wherein the first light source is configured to emit light toward a second side of the plugged honeycomb body opposite to the first side with a light emitting area larger than the profile of the first side of the plugged honeycomb body; wherein a part of the emitted light is obstructed from the first lens by the plugged honeycomb body, and another part of the emitted light is received by the first lens unobstructed by the plugged honeycomb body.

In some embodiments, the field of view encompasses the profile of the plugged honeycomb body when a longitudinal axis of the plugged honeycomb body is aligned relative to an optical axis of the first lens by an angle of up to 20°. In some embodiments, a parallax distortion is less than 0.3%. In some embodiments, the first lens is a telecentric lens. In some embodiments, the first light source is a diffuse light source. In some embodiments, the plugged honeycomb body comprises a plurality of longitudinal cells defining a plurality of channels that are at least partially blocked by a plurality of plugs, wherein the first camera is configured to image a gap between a wall of a longitudinal cell and a plug or an aperture in a plug in a partially blocked channel, or both.

In some embodiments, the apparatus further comprises an actuator that is configured to move the first camera, the first lens, or the plugged honeycomb body. In some embodiments, the actuator is configured to translate along three axes, and to rotate about at least two of the three axes.

In some embodiments, the apparatus further comprises a second light source disposed on the first side of the plugged honeycomb body. In some embodiments, the second light source is a ring light. In some embodiments, the first light source emits light at a first wavelength, and the second light source is configured to emit light defined by a second wavelength that is different than the first wavelength. In some embodiments, the apparatus further comprises a second camera disposed on the first side of the plugged honeycomb body, the second camera configured to image light defined by the second wavelength, the first camera configured to image light defined by the first wavelength; and a beam splitter optically interposed between the first camera and the first lens, and between the second camera and the first lens. In some embodiments, the first camera is configured to image light defined by the first wavelength and light defined by the second wavelength.

In some embodiments, the first light source is configured to emit red light and the second light source is configured to emit green light. In some embodiments, the apparatus further comprises a second camera disposed on the second side of the plugged honeycomb body; a second lens optically coupled to the second camera, the second lens having parallax distortion less than 0.3% in at least a portion of a field of view of the second lens; a first beam splitter optically interposed between the first camera and the first lens, and between the second light source and the first lens; and a second beam splitter optically interposed between the second camera and the second lens, and between the first light source and the second lens. In some embodiments, the first light source is configured to emit light defined by a first wavelength, and the second light source is configured to emit light defined by a second wavelength that is different than the first wavelength. In some embodiments, the apparatus further comprises a beam splitter optically interposed between the first camera and the first lens, and between the second light source and the first lens.

In another aspect, an apparatus for imaging a plugged honeycomb body is provided. The apparatus comprises a first imaging station, comprising: a first camera disposed on a first side of the plugged honeycomb body adjacent a first end surface of the plugged honeycomb body when the plugged honeycomb body is disposed in a first location; a first lens optically coupled to the first camera, the first lens having parallax distortion less than 0.3% in at least a portion of a field of view of the first lens that encompasses a profile of the plugged honeycomb body when a longitudinal axis of the plugged honeycomb body is misaligned relative to an optical axis of the first lens by less than or equal to 20°; a first actuator configured to move at least one of the first camera or the first lens; a first light source disposed on a second side of the plugged honeycomb body opposite the first side and adjacent a second end surface of the plugged honeycomb body, the first light source configured to project light at the plugged honeycomb body so that the plugged honeycomb body obstructs a portion of the projected light to project the profile of the honeycomb body on the first lens, the first light source defining an illumination area larger than the profile corresponding to the plugged honeycomb body, and the first light source configured to illuminate a portion of the first lens outward of the profile corresponding to the plugged honeycomb body; and a second light source disposed on the first side of the plugged honeycomb body; a material handler configured to move the plugged honeycomb body from the first location in the first imaging station to a second location in a second imaging station; and the second imaging station, comprising: a second camera disposed on the second side of the plugged honeycomb body adjacent the second end surface of the plugged honeycomb body when the plugged honeycomb body is disposed in the second location; a second lens optically coupled to the second camera, the second lens having parallax distortion less than 0.3% in at least a portion of a field of view of the second lens; a second actuator configured to move at least one of the second camera or the second lens; a third light source disposed on the first side of the plugged honeycomb body adjacent the first end surface of the plugged honeycomb body; and a fourth light source disposed on the second side of the plugged honeycomb body adjacent the second end surface of the plugged honeycomb body.

In some embodiments, the first light source is a diffuse light source, and the third light source is a diffuse light source. In some embodiments, the second light source is a ring light, and the fourth light source is a ring light. In some embodiments, the first lens is a telecentric lens, and the second lens is a telecentric lens.

In another aspect, a method of inspecting a plugged honeycomb body is provided. The method comprises illuminating the plugged honeycomb body with light from a first light source to project a profile of the plugged honeycomb body onto the first lens by obstructing a portion of the light with the plugged honeycomb body; capturing a first image of the profile corresponding to the plugged honeycomb body with the first camera; analyzing the profile in the first image to determine misalignment of a longitudinal axis of the plugged honeycomb body relative to an optical axis of the first lens; moving the actuator to change the alignment of the longitudinal axis of the plugged honeycomb body relative to the optical axis of the first lens by aligning the optical axis of the first lens and the longitudinal axis of the plugged honeycomb body; capturing a second image of the plugged honeycomb body with the first camera; illuminating the plugged honeycomb body with the second light source; and capturing a third image of the plugged honeycomb body with the first camera.

In some embodiments, the first lens has a parallax distortion less than 0.3% in at least a portion of a field of view of the first lens that encompasses the profile of the plugged honeycomb body when the longitudinal axis of the plugged honeycomb body is misaligned with the optical axis of the first lens by up to 20°, and wherein the first light source defines an illumination area larger than the profile of the plugged honeycomb body, and the first light source is configured to illuminate a portion of the first lens outward of the profile of the plugged honeycomb body.

In some embodiments, the method further comprises analyzing at least one of the second image or the third image to identify one or more leaks in the plugged honeycomb body. In some embodiments, the method further comprises analyzing at least one of the second image or the third image to measure a dimensional attribute of one or more identified leaks in the plugged honeycomb body.

IV. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. An apparatus for imaging a plugged honeycomb body, comprising:
   a first camera and a first lens optically coupled to a first camera, the first lens having a field of view;
   a first light source disposed opposite the first lens;
   a second light source, wherein the second light source is a ring light; and
   an actuator that is configured to move the first camera, the first lens, or the plugged honeycomb body;
   wherein the actuator is configured to translate along three axes, and to rotate about at least two of the three axes;
   wherein the plugged honeycomb body can be positioned between the first lens and the first light source such that the field of view encompasses a profile of a first side of the plugged honeycomb body;

wherein the second light source is disposed on the first side of the plugged honeycomb body;

wherein the first light source is configured to emit light toward a second side of the plugged honeycomb body opposite to the first side with a light emitting area larger than the profile of the first side of the plugged honeycomb body;

wherein a part of the emitted light is obstructed from the first lens by the plugged honeycomb body, and another part of the emitted light is received by the first lens unobstructed by the plugged honeycomb body.

2. The apparatus of claim 1, wherein the field of view encompasses the profile of the plugged honeycomb body when a longitudinal axis of the plugged honeycomb body is aligned relative to an optical axis of the first lens by an angle of up to 20°.

3. The apparatus of claim 1, wherein a parallax distortion is less than 0.3%.

4. The apparatus of claim 1, wherein the first lens is a telecentric lens.

5. The apparatus of claim 1, wherein the first light source is a diffuse light source.

6. The apparatus of claim 1, wherein the plugged honeycomb body comprises a plurality of longitudinal cells defining a plurality of channels that are at least partially blocked by a plurality of plugs, wherein the first camera is configured to image a gap between a wall of a longitudinal cell and a plug or an aperture in a plug in a partially blocked channel, or both.

7. The apparatus of claim 1, wherein the first light source emits light at a first wavelength, and the second light source is configured to emit light defined by a second wavelength that is different than the first wavelength.

8. The apparatus of claim 7, further comprising:
a second camera disposed on the first side of the plugged honeycomb body, the second camera configured to image light defined by the second wavelength, the first camera configured to image light defined by the first wavelength; and
a beam splitter optically interposed between the first camera and the first lens, and between the second camera and the first lens.

9. The apparatus of claim 1, wherein the first camera is configured to image light defined by the first wavelength and light defined by the second wavelength.

10. The apparatus of claim 1, further comprising:
a second camera disposed on the second side of the plugged honeycomb body;
a second lens optically coupled to the second camera, the second lens having parallax distortion less than 0.3% in at least a portion of a field of view of the second lens;
a first beam splitter optically interposed between the first camera and the first lens, and between the second light source and the first lens; and
a second beam splitter optically interposed between the second camera and the second lens, and between the first light source and the second lens.

11. The apparatus of claim 10, wherein the first light source is configured to emit light defined by a first wavelength, and the second light source is configured to emit light defined by a second wavelength that is different than the first wavelength.

12. The apparatus of claim 1, further comprising a beam splitter optically interposed between the first camera and the first lens, and between the second light source and the first lens.

13. A method of inspecting a plugged honeycomb body, comprising:
illuminating the plugged honeycomb body with light having a first wavelength from a first light source to project a profile of the plugged honeycomb body onto the first lens by obstructing a portion of the light with the plugged honeycomb body;
capturing a first image of the profile corresponding to the plugged honeycomb body with the first camera;
analyzing the profile in the first image to determine alignment of a longitudinal axis of the plugged honeycomb body relative to an optical axis of the first lens;
moving the actuator to change the alignment of the longitudinal axis of the plugged honeycomb body relative to the optical axis of the first lens by aligning the optical axis of the first lens and the longitudinal axis of the plugged honeycomb body;
capturing a second image of the plugged honeycomb body with the first camera;
illuminating the plugged honeycomb body with light having a second wavelength from a second light source, wherein the second wavelength is different from the first wavelength; and
capturing a third image of the plugged honeycomb body with the first camera.

14. The method of claim 13, wherein the first lens has a parallax distortion less than 0.3% in at least a portion of a field of view of the first lens that encompasses the profile of the plugged honeycomb body when the longitudinal axis of the plugged honeycomb body is aligned with the optical axis of the first lens by an angle of up to 20°, and wherein the first light source defines an illumination area larger than the profile of the plugged honeycomb body, and the first light source is configured to illuminate a portion of the first lens outward of the profile of the plugged honeycomb body.

15. The method of claim 13, further comprising analyzing at least one of the second image or the third image to identify one or more leaks in the plugged honeycomb body.

16. The method of claim 15, further comprising analyzing at least one of the second image or the third image to measure a dimensional attribute of one or more identified leaks in the plugged honeycomb body.

17. An apparatus for imaging a plugged honeycomb body, comprising:
a first camera and a first lens optically coupled to a first camera, the first lens having a field of view;
a first light source disposed opposite the first lens, wherein the first light source emits light at a first wavelength;
a second light source, wherein the second light source is configured to emit light defined by a second wavelength that is different than the first wavelength;
an actuator that is configured to move the first camera, the first lens, or the plugged honeycomb body; and
wherein the actuator is configured to translate along three axes, and to rotate about at least two of the three axes;
wherein the plugged honeycomb body can be positioned between the first lens and the first light source such that the field of view encompasses a profile of a first side of the plugged honeycomb body;
wherein the second light source is disposed on the first side of the plugged honeycomb body;
wherein the first light source is configured to emit light toward a second side of the plugged honeycomb body opposite to the first side with a light emitting area larger than the profile of the first side of the plugged honeycomb body;

wherein a part of the emitted light is obstructed from the first lens by the plugged honeycomb body, and another part of the emitted light is received by the first lens unobstructed by the plugged honeycomb body.

18. The apparatus of claim 17 wherein the second light source is a ring light.

19. An apparatus for imaging a plugged honeycomb body, comprising:

a first camera and a first lens optically coupled to a first camera, the first lens having a field of view;

a first light source disposed opposite the first lens, wherein the first light source emits light at a first wavelength;

a second light source disposed, wherein the second light source is configured to emit light defined by a second wavelength that is different than the first wavelength;

a second camera disposed on the plugged honeycomb body, the second camera configured to image light defined by the second wavelength, the first camera configured to image light defined by the first wavelength;

a beam splitter optically interposed between the first camera and the first lens, and between the second camera and the first lens; and an actuator that is configured to move the first camera, the first lens, or the plugged honeycomb body;

wherein the actuator is configured to translate along three axes, and to rotate about at least two of the three axes;

wherein the plugged honeycomb body can be positioned between the first lens and the first light source such that the field of view encompasses a profile of a first side of the plugged honeycomb body;

wherein the second light source is disposed on the first side of the plugged honeycomb body;

wherein the second camera is disposed on the first side of the plugged honeycomb body wherein the first light source is configured to emit light toward a second side of the plugged honeycomb body opposite to the first side with a light emitting area larger than the profile of the first side of the plugged honeycomb body;

wherein a part of the emitted light is obstructed from the first lens by the plugged honeycomb body, and another part of the emitted light is received by the first lens unobstructed by the plugged honeycomb body.

20. The apparatus of claim 19, wherein the second light source is a ring light.

21. An apparatus for imaging a plugged honeycomb body, comprising:

a first camera and a first lens optically coupled to a first camera, the first lens having a field of view;

a first light source disposed opposite the first lens;

a second light source;

an actuator that is configured to move the first camera, the first lens, or the plugged honeycomb body;

a second camera disposed on the plugged honeycomb body;

a second lens optically coupled to the second camera, the second lens having parallax distortion less than 0.3% in at least a portion of a field of view of the second lens;

a first beam splitter optically interposed between the first camera and the first lens, and between the second light source and the first lens; and a second beam splitter optically interposed between the second camera and the second lens, and between the first light source and the second lens;

wherein the actuator is configured to translate along three axes, and to rotate about at least two of the three axes;

wherein the plugged honeycomb body can be positioned between the first lens and the first light source such that the field of view encompasses a profile of a first side of the plugged honeycomb body;

wherein the second light source is disposed on the first side of the plugged honeycomb body;

wherein the second camera is disposed on the second side of the plugged honeycomb body;

wherein the first light source is configured to emit light toward a second side of the plugged honeycomb body opposite to the first side with a light emitting area larger than the profile of the first side of the plugged honeycomb body;

wherein a part of the emitted light is obstructed from the first lens by the plugged honeycomb body, and another part of the emitted light is received by the first lens unobstructed by the plugged honeycomb body.

22. The apparatus of claim 21, wherein the first light source is configured to emit light defined by a first wavelength, and the second light source is configured to emit light defined by a second wavelength that is different than the first wavelength.

23. The apparatus of claim 21, wherein the second light source is a ring light.

24. An apparatus for imaging a plugged honeycomb body, comprising:

a first camera and a first lens optically coupled to a first camera, the first lens having a field of view;

a first light source disposed opposite the first lens;

a second light source;

an actuator that is configured to move the first camera, the first lens, or the plugged honeycomb body;

a second camera disposed on the plugged honeycomb body;

a second lens optically coupled to the second camera, the second lens having parallax distortion less than 0.3% in at least a portion of a field of view of the second lens;

a first beam splitter optically interposed between the first camera and the first lens, and between the second light source and the first lens; and a second beam splitter optically interposed between the second camera and the second lens, and between the first light source and the second lens;

wherein the actuator is configured to translate along three axes, and to rotate about at least two of the three axes;

wherein the plugged honeycomb body can be positioned between the first lens and the first light source such that the field of view encompasses a profile of a first side of the plugged honeycomb body;

wherein the second light source is disposed on the first side of the plugged honeycomb body;

wherein the first light source is configured to emit light defined by a first wavelength, and the second light source is configured to emit light defined by a second wavelength that is different than the first wavelength;

wherein the second camera is disposed on the second side of the plugged honeycomb body;

wherein the first light source is configured to emit light toward a second side of the plugged honeycomb body opposite to the first side with a light emitting area larger than the profile of the first side of the plugged honeycomb body;

wherein a part of the emitted light is obstructed from the first lens by the plugged honeycomb body, and another part of the emitted light is received by the first lens unobstructed by the plugged honeycomb body.

25. The apparatus of claim 24, wherein the second light source is a ring light.

* * * * *